United States Patent [19]
Kato et al.

[11] Patent Number: 5,517,959
[45] Date of Patent: May 21, 1996

[54] LUBRICATING APPARATUS FOR AN ENGINE

[75] Inventors: Zenichiro Kato; Touyu Ichimiya, both of Mishima; Ryuichi Matsushiro, Okazaki; Toshihiko Igashira, Toyokawa; Shigeo Sasao, Nishio, all of Japan

[73] Assignees: Toyota Jidosha Kabushiki Kaisha, Toyota; Nippon Soken, Inc., Nishio, both of Japan

[21] Appl. No.: 183,216

[22] Filed: Jan. 18, 1994

[30] Foreign Application Priority Data

Jan. 19, 1993 [JP] Japan .................................... 5-007039
Apr. 12, 1993 [JP] Japan .................................... 5-084900
Nov. 15, 1993 [JP] Japan .................................... 5-285340

[51] Int. Cl.$^6$ ...................................................... F01M 1/06
[52] U.S. Cl. ................................ 123/196 AB; 123/196.5; 184/104.1; 184/6.5
[58] Field of Search ....................... 123/196 R, 196 CP, 123/196 S, 195 G, 196 AB; 184/104.1, 6.5

[56] References Cited

U.S. PATENT DOCUMENTS

| | | | |
|---|---|---|---|
| 2,827,342 | 3/1958 | Reach | 184/6.5 |
| 3,416,633 | 12/1968 | Swearingen | 184/104.1 |
| 4,134,380 | 1/1979 | Niwa et al. | 184/6.5 |
| 4,616,609 | 10/1986 | Munch et al. | 123/196 AB |
| 5,275,258 | 1/1994 | Bousseau | 184/6.5 |
| 5,301,642 | 4/1994 | Matsushiro et al. | 123/196 AB |
| 5,339,776 | 8/1994 | Regueiro | 123/196 CP |

FOREIGN PATENT DOCUMENTS 63-2813U  1/1988  Japan .

Primary Examiner—Erick R. Solis
Attorney, Agent, or Firm—Kenyon & Kenyon

[57] ABSTRACT

A lubricating apparatus is disclosed for use in an engine having a crankshaft, at least one bearing for the crankshaft, and an oil pan for storing a lubricating oil reserve. The apparatus comprises a pump for pumping the oil up from the oil pan, an oil passage for providing fluid communication between a discharge port of the pump and the bearing to supply the oil to the bearing, and an oil recirculation passage for providing communication between the bearing and an inlet port of the pump to return the oil at the bearing to the pump. The apparatus further includes a temperature activated valve assembly along the recirculation passage. The valve assembly allows the oil to return from the bearing to the pump through the oil recirculation passage, when the temperature of the engine is below a predetermined temperature.

17 Claims, 21 Drawing Sheets

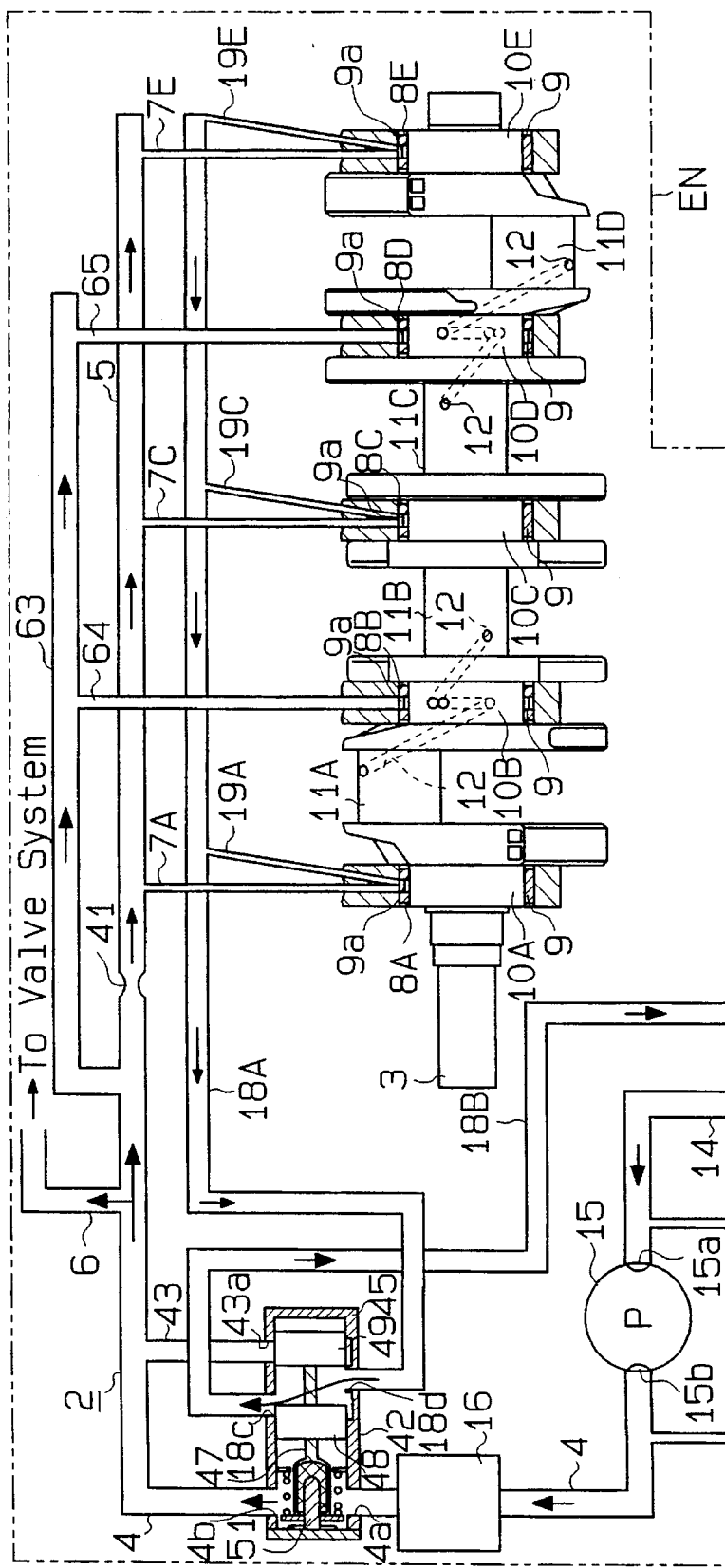
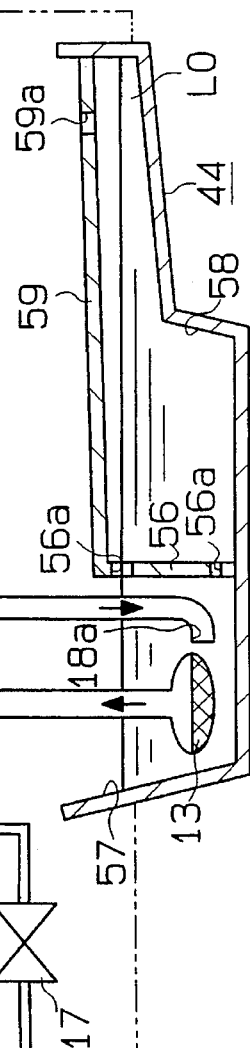
Fig. 12

LUBRICATING APPARATUS FOR AN ENGINE

BACKGROUND OF THE INVENTION

Field of the Invention

The present invention relates to a lubricating apparatus for supplying a lubricating fluid, such as for example oil, to the moving parts of a crankshaft drive system including the crankshaft, connecting rods and pistons of an engine.

Description of the Related Art

A typical lubricating apparatus for an engine is the pressure supply type which supplies a pressurized lubricating oil or alternate fluid medium to the moving parts of the engine for compelled lubrication. The lubricating oil is stored in a sump which may be for instance an oil pan. An oil pump of the positive displacement type circulates the oil through an oil filter, and supplies the individual moving parts with oil passages formed in the crankshaft, cylinder block, cylinder head, etc. That is, the lubricating oil is supplied to the moving parts of the crankshaft system including the crankshaft, connecting rods (hereinafter called "con'rods"), and pistons. The lubricating oil is also supplied to the moving parts of the valve drive system including a camshaft for driving intake and exhaust valves.

This type of lubricating apparatus is disclosed in, for example, Japanese Unexamined Utility Model No. 63-2813. In this conventional apparatus, the passages for the lubricating oil that is supplied under pressure from the oil pump are grouped into a main oil gallery for supplying the lubricating oil to the moving parts of the crankshaft system and a valve system oil gallery for supplying the lubricating oil to the valve drive system. Area changing means is provided midway of the valve-system oil gallery, and increases the effective cross section of the oil gallery at a low temperature and decreases that effective cross section at the normal and higher temperatures.

At low temperatures when the oil viscosity is high, the area changing means does not allow a reduction in the amount of the lubricating oil to be supplied to the valve drive system, thus ensuring the lubrication of the valve system. Since the amount of the supply of the lubricating oil with a high viscosity to the crankshaft system is reduced at this time by the nature of high viscosity oil flow, the oil film at each bearing of the crankshaft system becomes thinner. This minimizes an increase in frictional loss or viscosity resistance at the bearing in the crankshaft system, caused by the oil with a high viscosity. At normal and higher temperatures, which provide low oil viscosity, the area changing means provides a sufficient amount of the lubricating oil to be supplied to the valve system, and prevents insufficient supply of the lubricating oil to the crankshaft system.

According to the above-mentioned apparatus, therefore, it is desirable that the temperature of the lubricating oil quickly rise, reducing the viscosity of the lubricating oil, while making the oil film at each bearing of the crankshaft system thinner, in order to suppress the increased frictional loss that occurs at bearings at a low temperature. The temperature of the lubricating oil may be increased by the provision of special heating means, such as a heater, as well as the heat generated in the engine.

It is known that the heat generated in the engine is generally transmitted more to the crankshaft system than to the valve system. According to the conventional art the oil film at the bearing is made thinner by simply reducing the amount of the lubricating oil supply to the crankshaft system at low temperatures. Therefore, the warm-up time for the entire lubricating oil circulation system tends to become longer, while the oil film and corresponding frictional loss at that bearing is reduced. This is likely to cause the overall frictional loss at each moving part including the bearing to be relatively large for a long period of time until the warm-up of the lubricating oil is completed.

Conventional, typical engines, like the above-described art, must cope with insufficient supply of the lubricating oil to the crankshaft system. Further, the crankshaft system is designed in such a way that the lubricating oil supplied to the bearings is supplied to the crank pins and con'rods, and the pistons and cylinders or the like, via oil passages. It is thus desirable to supply a sufficient amount of lubricating oil to those individual moving parts too.

SUMMARY OF THE INVENTION

Accordingly, it is a primary objective of the present invention to provide an improved lubricating system apparatus for an engine, which makes the oil film at bearings for a crankshaft thinner without decreasing the amount of oil supply when the engine is cool, thereby suppressing the frictional loss or viscosity resistance at the bearings.

It is an additional objective of the present invention to provide a lubricating apparatus which allows for a sufficient amount of the lubricating oil to be supplied to the crankshaft bearings when the warming-up of the engine is completed.

It is a further objective of the present invention to provide a lubricating apparatus which allows for the sufficient amount of the lubricating oil to be supplied from the bearings of the crankshaft to the other moving parts of the engine even when the engine is cool, thereby ensuring full lubrication of all moving parts of the engine.

To achieve the foregoing and other objects and in accordance with the purposes of the present invention, an improved lubricating system apparatus for an engine is provided.

The engine of the present invention includes a crankshaft, at least one bearing for supporting the crankshaft, and an oil pan for storing of a lubricating oil. The improved apparatus comprises a pump, a first oil passage, and an oil recirculation passage. The pump has an inlet port and a discharge port, and pumps the oil input from the oil pan to discharge its oil through the discharge port. The first oil passage provides the communication between the discharge port and the crankshaft bearing supplying the oil from the pump to the bearing. The oil recirculation passage provides the communication between the bearing and the inlet port to return the oversupplied oil at the bearing to the pump, thereby causing the oil recirculation.

The apparatus further comprises a control unit mechanism provided along the oil recirculation passage, for controlling the oil recirculation in accordance with the warming-up condition of the engine. The control unit mechanism includes a valve assembly for allowing the oil to return from the bearing to the pump via the oil recirculation passage, when the temperature of the engine is lower than a predetermined temperature.

BRIEF DESCRIPTION OF THE DRAWINGS

The features of the present invention that are believed to be novel are set forth with particularity in the appended claims. The invention, together with objects and advantages thereof, may best be understood by reference to the following description of the preferred embodiments together with the accompanying drawings.

FIGS. 1 through 3 illustrate a first embodiment of the present invention, in which:

FIG. 1 is a schematic structural diagram of a lubricating apparatus for an engine;

FIG. 2 is a diagram showing in enlargement a part of a bearing of a crankshaft.

FIGS. 4 through 6 illustrate a second embodiment of the present invention, in which:

FIG. 4 is a schematic structural diagram of a lubricating apparatus for an engine;

FIG. 5 is a cross-sectional view of an oil tank; and

FIG. 6 is a plan view showing an oil hole of the oil tank.

FIGS. 7 through 10 illustrate a third embodiment of the present invention, in which:

FIG. 7 is a schematic structural diagram of a lubricating apparatus for an engine;

FIG. 8 is also a schematic structural diagram showing the lubricating apparatus for an engine;

FIG. 10 is a perspective view showing an oil pan.

FIG. 12 is a schematic structural diagram showing a lubricating apparatus for an engine according to a fifth embodiment of the present invention.

FIGS. 14 through 17 illustrate a seventh embodiment of the present invention, in which:

FIG. 14 is a schematic structural diagram of a lubricating apparatus for an engine;

FIG. 15 is a cross-sectional view showing a bearing for a crankshaft and a housing for its bearing;

FIG. 16 is a cross-sectional view showing the bearing and other parts of a valve system; and FIG. 17 is a schematic diagram showing how an oil jet pipe is arranged.

FIGS. 19A, 19B, 20A and 20B illustrate a ninth embodiment of the present invention, in which:

FIG. 19A is a schematic structural diagram showing a lubricating apparatus for an engine;

FIG. 19B is a cross-sectional view showing a bearing for a crankshaft and its bearing housing; and FIGS. 20A and 20B are cross sections taken along line A—A in FIG. 19B.

FIGS. 21 through 24 illustrate a tenth embodiment of the present invention, in which:

FIG. 21 is a schematic structural diagram of a lubricating apparatus for an engine;

FIG. 22 is a cross-sectional view showing a bearing of a crankshaft and its bearing housing;

FIG. 23 is a cross-sectional view showing the structure of a bearing metal; and

FIG. 24 is a partly cutaway cross-sectional view showing the end portion of each camshaft.

FIGS. 25 and 26 illustrate an eleventh embodiment of the present invention, in which:

FIG. 25 is a cross-sectional view showing a bearing of a crankshaft and its bearing housing; and FIG. 26 is a cross section taken along line B—B in FIG. 25.

FIGS. 27 through 34 illustrate modifications of the present invention, in which:

FIGS. 27 through 30 are schematic structural diagrams each showing a part of a lubricating apparatus for an engine;

FIG. 31 is a cross-sectional view showing the manner of the attachment between an oil recirculation passage and a strainer pipe;

FIG. 32 is a partly cutaway front view of a connecting rod;

FIG. 33 is a cross-sectional view showing the structure of a bearing metal; and

FIG. 34 is a cross-sectional view showing the structure of an another bearing metal.

DETAILED DESCRIPTION OF THE PREFERRED EMBODIMENTS

First Embodiment

A lubricating apparatus for an engine according to the first embodiment of this invention will now be described referring to FIGS. 1, 2, 3A and 3B.

Figure 1:
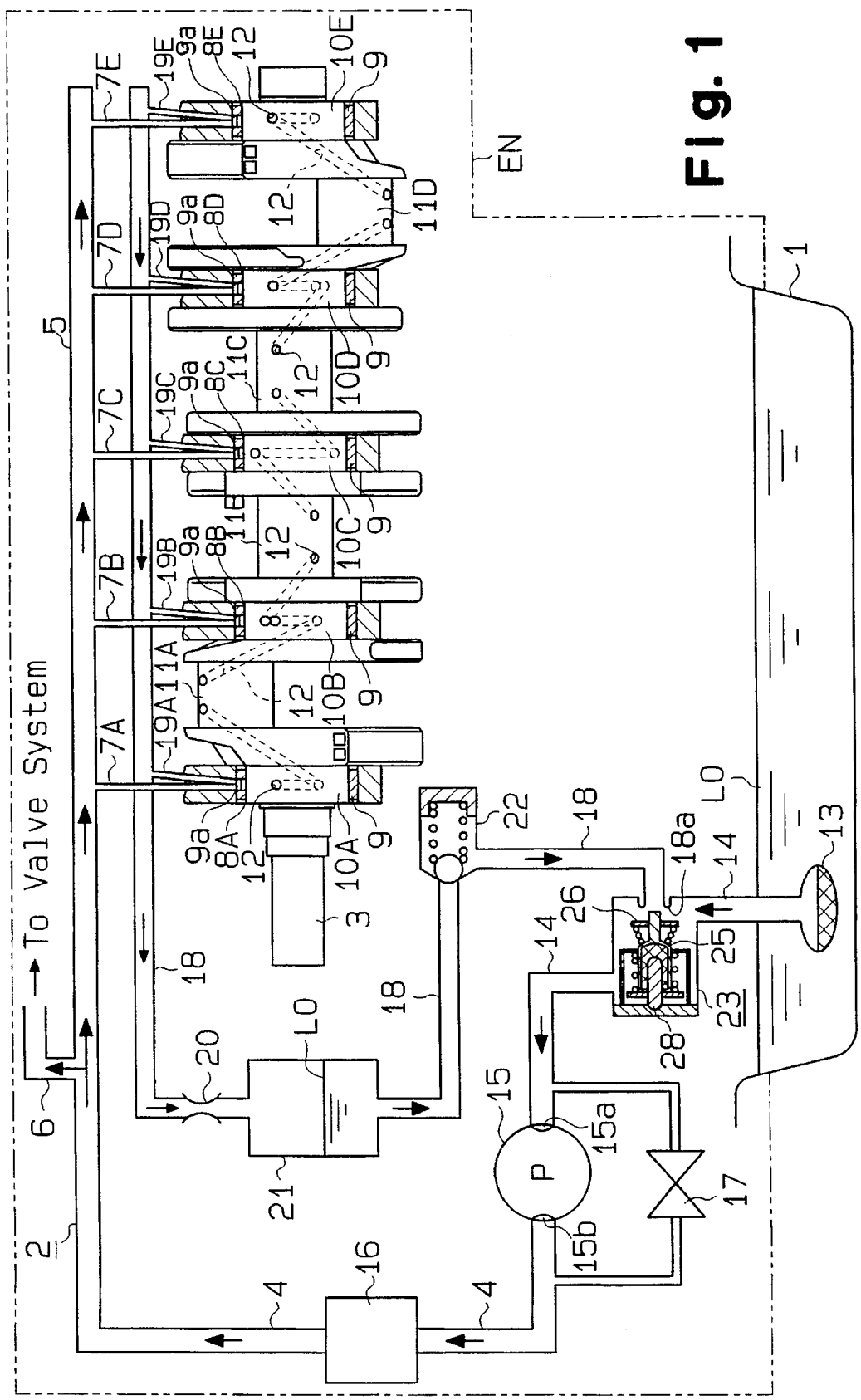

FIG. 1 presents a schematic structural diagram of the lubricating system apparatus for an engine according to this embodiment. A lubricating oil LO is reserved inside an oil pan 1 provided at the bottom portion of an engine EN. This lubricating oil LO is supplied to the crankshaft system and valve system of the engine EN to lubricate the individual moving parts. For this purpose, a first oil supplying passage/conduit 2 for conducting the lubricating oil LO is formed inside each cylinder block (not shown) constituting the engine EN. The crankshaft system is the drive mechanism that rotates a crankshaft 3, and includes the crankshaft 3, con'rods (not shown) that fit on the crankshaft 3, and pistons (not shown). The valve system is the drive mechanism that drives an inlet valve and an exhaust valve, and includes camshafts, valve lifters and camshaft gears (not shown), which are disposed on cylinder heads (not shown).

The first oil supplying passage 2 consists of a main oil passage 4 extending from the oil pan 1 and branching into a crankshaft-system oil passage 5 and a valve-system oil passage. The crankshaft-system oil passage 5 is provided in association with and for lubrication of the crankshaft system, while the valve-system oil passage 6 is provided in association with and for lubrication of the valve system (not shown). In this embodiment, the inside diameters of those oil passages 5 and 6 are so determined to provide the proper amounts of lubricating oil LO to be distributed to the oil passages 5 and 6 from the main oil passage 4.

The downstream side of the crankshaft-system oil passage 5 branches into a plurality of oil passages (five oil passages in this embodiment) 7A to 7E. The distal ends of those oil passages 7A to 7E are respectively connected to a plurality of bearings (five bearings in this embodiment) 8A to 8E. The bearings 8A to 8E rotatably support crank journals 10A to 10E via bearing metals 9, respectively.

Figure 2:
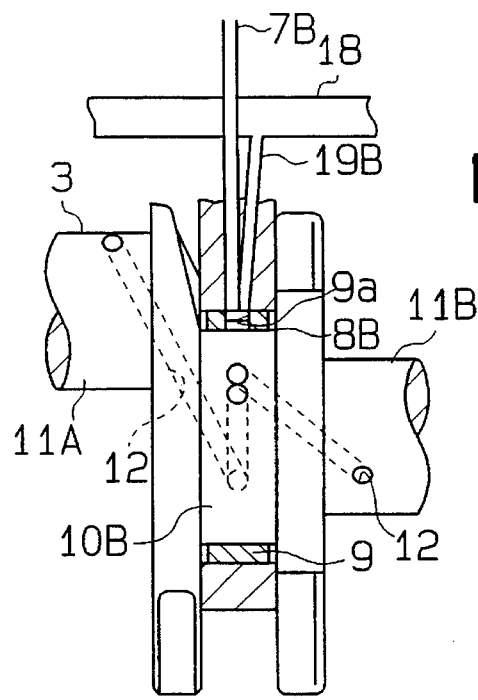

FIG. 2 shows in enlargement a part of the bearing 8B as representative of the bearings 8A–8E. As is apparent from this diagram, an oil groove 9a is formed in each bearing metal 9 and the distal end of the oil passage 7B is connected to that oil groove 9a. In this embodiment, the oil groove 9a runs half around the bearing metal 9 in its inner wall. A second oil supplying passage 12 for connecting the crank journals 10A to 10E to respective crank pins 11A to 11D is formed in the crankshaft 3.

Referring again now to FIG. 1, an oil strainer 13, a strainer pipe 14, an oil pump 15 and an oil filter 16 are provided in the main oil passage 4 in order from the upstream side. The oil strainer 13 collects relatively large pieces of dust that mix with the lubricating oil LO in the oil pan 1. The oil pump 15 has an inlet port 15a and a discharge port 15b, and is driven by the rotation of the crankshaft 3 to pump the lubricating oil LO up from the oil pan 1 and deliver it to the main oil passage 4 from the discharge port 15b. The oil filter 16 collects fine pieces of dust in the lubricating oil LO pumped up by the oil pump 15.

A relief valve 17 is provided in the main oil passage 4 between the oil pump 15 and the oil filter 16. This relief valve 17 adjusts the pressure of the lubricating oil LO pumped out by the oil pump 15. That is, the relief valve 17 returns the lubricating oil LO to the inlet side of the oil pump 15 when the supplying pressure of the lubricating oil LO exceeds a predetermined set value. This adjusts the pressure of the lubricating oil LO, keeping the pressure in the main oil passage 4 constant.

Still referring to FIG. 1, as the oil pump 15 is driven when the engine EN runs, part of the lubricating oil LO in the oil pan 1 is supplied to the crankshaft-system oil passage 5 and valve-system oil passage 6 under pressure after passing through oil strainer 13, strainer pipe 14 and oil pump 15. The lubricating oil LO delivered to the crankshaft-system oil passage 5 under pressure is supplied to the bearings 8A to 8E via the respective oil passages 7A to 7E for lubrication. Part of the lubricating oil LO supplied to the bearings 8A–8E is supplied via the second oil supplying passage 12 to the individual crank pins 11A–11D for lubrication. Part of the lubricating oil LO supplied to the crank pins 11A–11D is further supplied to other moving parts, such as the con'rods, pistons and cylinders, for lubrication. The lubricating oil LO sent to the valve-system oil passage 6 is supplied to the individual moving parts of the valve system for lubrication.

Part of the lubricating oil LO supplied to the crankshaft system for lubrication falls by gravitational force to return to the oil pan 1. Part of the lubricating oil LO supplied to the valve system for lubrication returns by to the oil pan 1 due to gravity via a return hole (not shown).

The structure of this embodiment as described above is basically the same as that of an ordinary lubricating apparatus, but differs in the following points. An oil recirculation passage 18 is formed in the cylinder block in association with the crankshaft system. This oil recirculation passage 18 serves to directly return the lubricating oil LO, supplied to the individual bearings 8A–8E via the crankshaft-system oil passage 5 and the individual oil passages 7A–7E, directly to the inlet side of the oil pump 15 for recirculation. The upstream side of the oil recirculation passage 18 branches into a plurality of oil passages (five passages in this embodiment) 19A to 19E. The distal ends of the individual oil passages 19A–19E are connected to the oil grooves 9a of the bearings 9. A restrictor 20, an oil tank 21 and a check valve 22 are disposed midway in the oil recirculation passage 18. The downstream side of the oil recirculation passage 18 is connected via a second oil control valve 23 to the strainer pipe 14.

The restrictor 20 suppresses a certain degree of the flow of the lubricating oil LO toward the oil recirculation passage 18 from the individual bearings 8A–8E via the respective oil passages 19A–19E. The oil tank 21 temporarily reserves part of the lubricating oil LO running through the oil recirculation passage 18, and prevents air from mixing with the lubricating oil LO that returns to the inlet side of the oil pump 15. A certain amount of the lubricating oil LO is retained in reserve in the oil tank 21. The check valve 22 holds the lubricating oil LO in the oil tank 21 when the engine EN stops. When the engine EN starts at a low operating temperature, the lubricating oil LO held in the check valve 22 prevents air from being sucked into the oil pump 15.

Figure 3A:
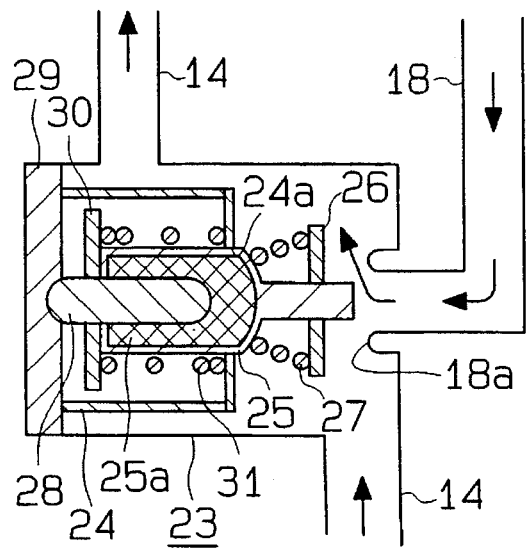
FIGS. 3A and 3B are diagrams illustrating the structure and action of an oil control valve.
Figure 3B:
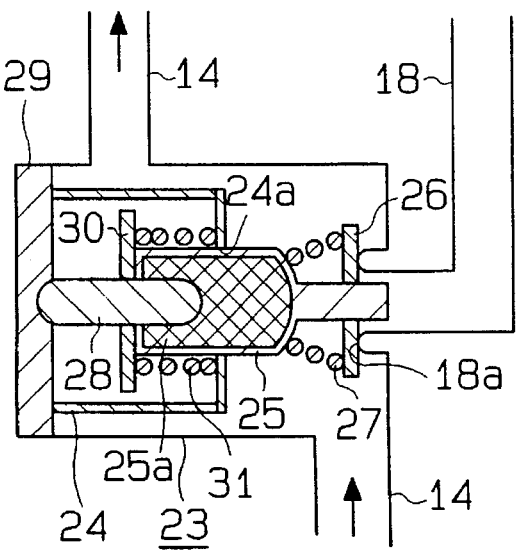

The second oil control valve 23 is of a temperature sensitive type which opens to permit recirculation 0f the lubricating oil LO through the oil recirculation passage 18 when the temperature of the engine EN is low. As shown in FIGS. 3A and 3B, the oil control valve 23 is disposed in the midway of the strainer pipe 14. This oil control valve 23 has a casing 24 in which a hole 24a is formed. An operational shaft 25 is reciprocally disposed in the hole 24a so as to be able to reciprocate in the axial direction. A valve piece 26 is attached to the distal end of the operational shaft 25, which protrudes out of the casing 24. A spring 27 is attached to this valve piece 26 to urge the valve piece 26 toward the distal end of the operational shaft 25. The valve piece 26 is disposed in an opening/closing association with a recirculation port 18a which acts as a valve seat and is connected to the oil recirculation passage 18.

In the casing 24, an elongated pin 28 is slidably inserted in the proximal end of the operational shaft 25. The proximal end of this pin 28 is fixed to a base 29. A thermo wax 25a is sealed in contact with the pin 28 inside the operational shaft 25. The thermo wax 25a expands to increase its volume as the temperature rises. A washer 30 is secured to the proximal end of the operational shaft 25. A spring 31 is disposed on the operational shaft 25 between the washer 30 and the casing 24. As the ambient temperature surrounding the operational shaft 25 rises, the thermo wax 25a expands, driving the pin 28 out of the thermo wax 25a. The ambient temperature is influenced by the heat transmitted to the casing 24 from the engine's cylinder block via the base 29 and from the hot lubricating oil LO.

When the temperature of the engine EN is low, therefore, the thermo wax 25a contracts so that most of the operational shaft 25 comes inside the casing 24 due to the urging force of the spring 31, as shown in FIG. 3A. As a result, the valve piece 26 comes to the open position. Consequently, the recirculation port 18a and the second oil control valve 23 are open. When the temperature of the engine EN is high after warm-up, on the other hand, the thermo wax 25a expands so that the operational shaft 25 protrudes out of the casing 24, moving the valve piece 26 to the closed position. Consequently, the recirculation port 18a as shown in FIG. 3B and the second oil control valve 23 are closed. In this embodiment, the thermo wax 25a is designed to expand at "80° C.", thereby closing the second oil control valve 23.

The operation of the thus structured lubricating apparatus for an engine will now be described. When the temperature of the engine EN is low, the second oil control valve 23 is open. As the engine EN starts and the oil pump 15 is driven by the crankshaft, the lubricating oil LO is pumped up to the main oil passage 4 from the oil pan 1. This lubricating oil LO is supplied to the crankshaft-system oil passage 5 and valve-system oil passage 6 under pressure. The lubricating oil LO sent to the crankshaft-system oil passage under pressure is delivered to the individual bearings 8A to 8E via the respective oil passages 7A to 7E for lubrication. The lubricating oil LO is also supplied to the individual crank pins 11A to 11D from the respective crank journals 10A to 10E via the second oil supplying passage 12 and is further delivered to the moving parts such as the con'rods, pistons and cylinders for lubrication. Meantime, the lubricating oil LO sent to the valve-system oil passage 6 under pressure is supplied to the individual moving parts of the valve system for lubrication.

As the second oil control valve 23 is open at this low temperature, the suction force of the oil pump 15 also acts on the oil recirculation passage 18. The suction force opens the check valve 22, allowing the lubricating oil LO to be sucked into the oil recirculation passage 18 from the oil grooves 9a of the individual bearings 8A to 8E via the respective oil passages 19A to 19E. The lubricating oil LO urged by the vacuum force of the pump 15 directly returns to the strainer pipe 14 via the oil recirculation passage 18, oil tank 21, check valve 22 and oil control valve 23. The returned lubricating oil LO is expelled again to the main oil passage 4 from the oil pump 15 to recirculate to the bearings 8A to 8E.

At this time, as the lubricating oil LO is sucked out to the oil recirculation passage 18 from the oil grooves 9a, the oil pressure at each of the bearings 8A to 8E drops. This increases the amount of the lubricating oil LO which is recirculated to the oil recirculation passage 18 via the individual bearings 8A–8E from the crankshaft-system oil passage 5, while the oil films formed between the bearing metals 9 of those bearings 8A–8E and the crank journals 10A–10E are kept thin, thus reducing the frictional loss. The reduction in oil pressure in the oil grooves 9a of the bearings 8A–8E decreases the pressure loss of the oil pump 15, because the pressure difference between the inlet port 15a and the discharge port 15b is reduced by the amount of pressure of lubricating oil LO in the oil recirculation passage 18, thus reducing the loss of the power to drive the oil pump 15.

Further, most of the lubricating oil LO heated at the individual bearings 8A to 8E is sucked out to the oil recirculation passage 18 to directly return to the strainer pipe 14 without falling into the oil pan 1. With the engine EN at a low temperature, therefore, the lubricating oil LO which is heated to some degree by engine frictional heat transfer quickly returns to the inlet side of the oil pump 15 and is pumped out again therefrom. This helps the heating of the lubricating oil LO which is to be pumped out to the main oil passage 4 from the oil pump 15. Accordingly, the amount of lubricating oil LO supplied to the crankshaft system will not particularly be reduced when the engine EN is at a low temperature.

Part of the lubricating oil LO is effectively heated in the above manner by the crankshaft system which receives more heat than the valve system. It is therefore possible to shorten the warm-up time for the lubricating oil LO to be supplied to the individual moving parts including the bearings 8A to 8E of the engine EN. The shorter warm-up time for the lubricating oil LO will promptly reduce the frictional loss at the individual moving parts including the bearings 8A to 8E. The reduction of the frictional loss will improve the fuel mileage of the engine EN. In addition, the shortening of the warm-up time for the lubricating oil LO will improve the warm-up of the engine EN itself, thus improving the combustibility of the fuel. This will result in the improvement of the starting characteristic of the engine EN at a low temperature, contributing to an improvement of the engine's exhaust emissions at the time of the low-temperature starting.

When the engine EN warms up and its temperature exceeds "80° C.", the second oil control valve 23 is closed. Consequently, the suction force of the pump 15 will not act on the oil recirculation passage 18, allowing the check valve 22 to close. Therefore, the lubricating oil LO at each of the bearings 8A to 8E will not be returned directly to the strainer pipe 14 via the oil recirculation passage 18 or the like from the associated one of the oil passages 19A to 19E. The lubricating oil LO used for lubrication at each of the bearings 8A–8E simply falls into the oil pan 1 due to the dead weight force of gravity.

Second Embodiment

Figure 5:
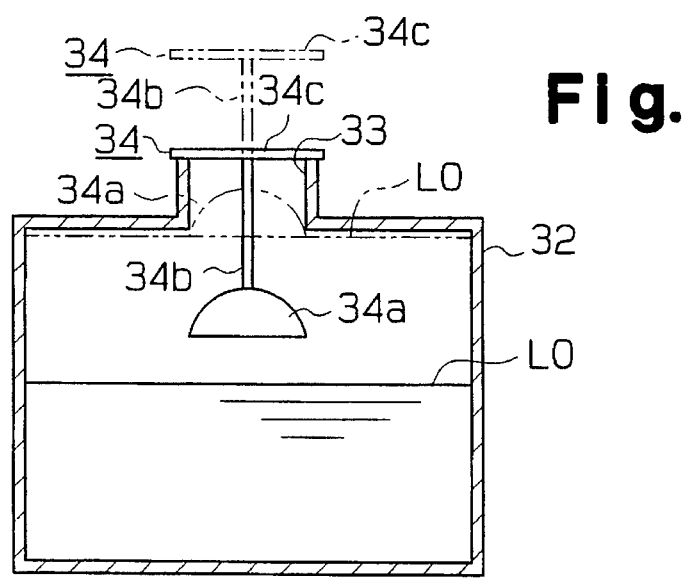
Figure 6:
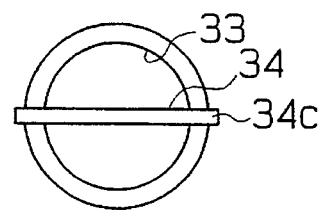

A lubricating apparatus for an engine according to the second embodiment of this invention will now be described referring to FIGS. 4 to 6.

Figure 4:
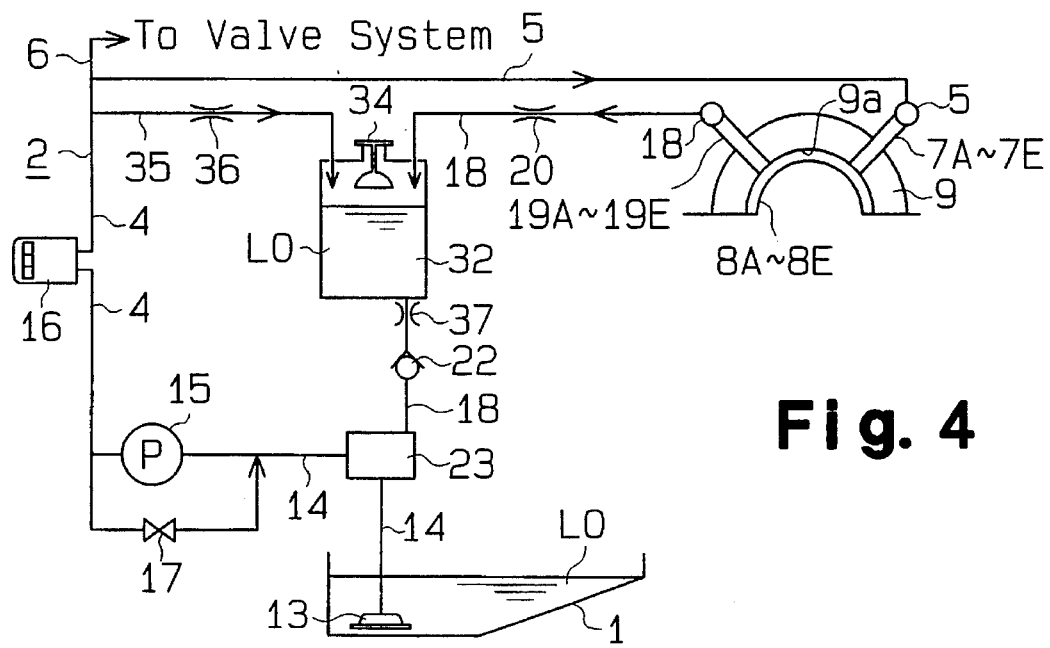

FIG. 4 presents a schematic structural diagram of the lubricating apparatus for an engine according to this embodiment, which is basically similar to that of the first embodiment. The same reference numerals as used for the first embodiment will also be used to specify basically the same components in the second embodiment to avoid repeating their description. The following description will be centered on the particular differences between the second embodiment and the first embodiment.

This embodiment differs from the first one in the structure of its oil tank 32. FIG. 5 presents the cross section of the oil tank 32. An air vent hole 33 is formed so as to open upward, in the top of the oil tank 32. A control valve 34 is disposed at the location of the air vent hole 33 to open and close this air vent hole 33. The control valve 34 has a hemispherical valve piece 34a located inside the oil tank 32, and a rod 34b extending upward from the valve piece 34a, with a horizontally-extending hook piece 34c integrally formed at the distal end of the rod 34b. As shown in FIGS. 5 and 6, the hook piece 34c is formed longer than the outside diameter of the air vent hole 33 so that both ends can be hooked at the upper end of the hole 33. The outside diameter of the valve piece 34a is set slightly larger than the inside diameter of the air vent hole 33, so that the hole 33 is closable by the valve piece 34a.

This control valve 34 is activated in accordance with a change in the level of the lubricating oil LO in the oil tank 32. More specifically, when the level of the lubricating oil LO falls as indicated by the solid line in FIG. 5, the valve piece 34a of the control valve 34 moves downward by the force of gravity acting on its dead weight, allowing the control valve 34 to be hooked over the air vent hole 33 by the hook piece 34c. That is, the air vent hole 33 is open. When the level of the lubricating oil LO rises as shown drawn in phantom in FIG. 5, on the other hand, the valve piece 34a of the control valve 34 moves upward with the fluid level, and closes the air vent hole 33.

As shown in FIG. 4, besides the oil recirculation passage 18 extending from the individual bearings 8A to 8E, an oil passage 35 extending from the main oil passage 4 is connected to the oil tank 32. A restrictor 36 is provided midway in the oil passage 35. An another restrictor 37 is provided in the oil recirculation passage 18 between the oil tank 32 and the check valve 22. The three restrictors 20, 36 and 37 serve to set the pressure balances at the individual portions, such as the pressure in the oil tank 32, the pressures in the oil grooves 9a of the bearing metals 9 or the pressure in the oil supplying passage 2. The pressure balance at each portion can be set as desired by arbitrarily selecting the diameters of those restrictors 20, 36 and 37.

This embodiment can therefore have the same action and advantage as the first embodiment in shortening the warm-up time for the lubricating oil LO.

In addition, the lubricating oil LO returning to the oil recirculation passage 18 from the individual bearings 8A–8E is stored up in the oil tank 32 and the lubricating oil LO sent via the oil passage 35 from the main oil passage 4 is also retained in this tank 32 in this embodiment. In the oil tank 32, air is separated from the lubricating oil LO and is accumulated inside the tank 32. The accumulation of air decreases the level of the lubricating oil LO, and the control valve 34 moves downward by the force of gravity acting on its dead weight, thus opening the air vent hole 33. Consequently, the air held in the oil tank 32 escapes through the hole 33. As the amount of the lubricating oil LO in the oil tank 32 increases, the fluid level rises again to lift the control valve 3, allowing the valve piece 34a to close the air vent hole 33 again. The repeated action of the control valve 34 automatically discharges the air out of the oil tank 32. This separates the air from the lubricating oil LO, which is recirculated via the oil recirculation passage 18, and prevents the air from being sucked into the oil pump 15.

Third Embodiment

A lubricating apparatus for an engine according to the third embodiment of this invention will now be described in detail referring to FIGS. 7 through 10.

Figure 7:
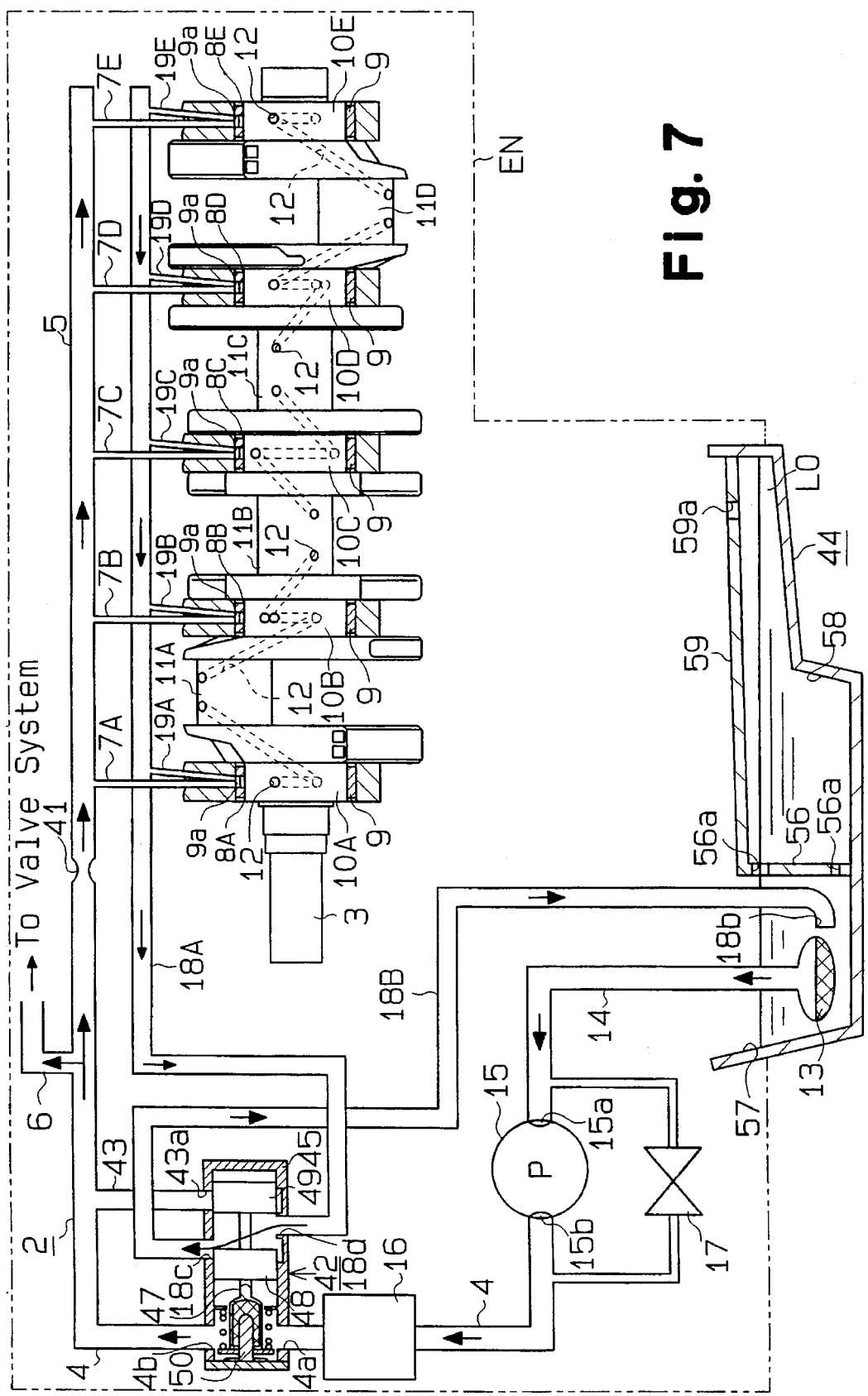
Figure 8:
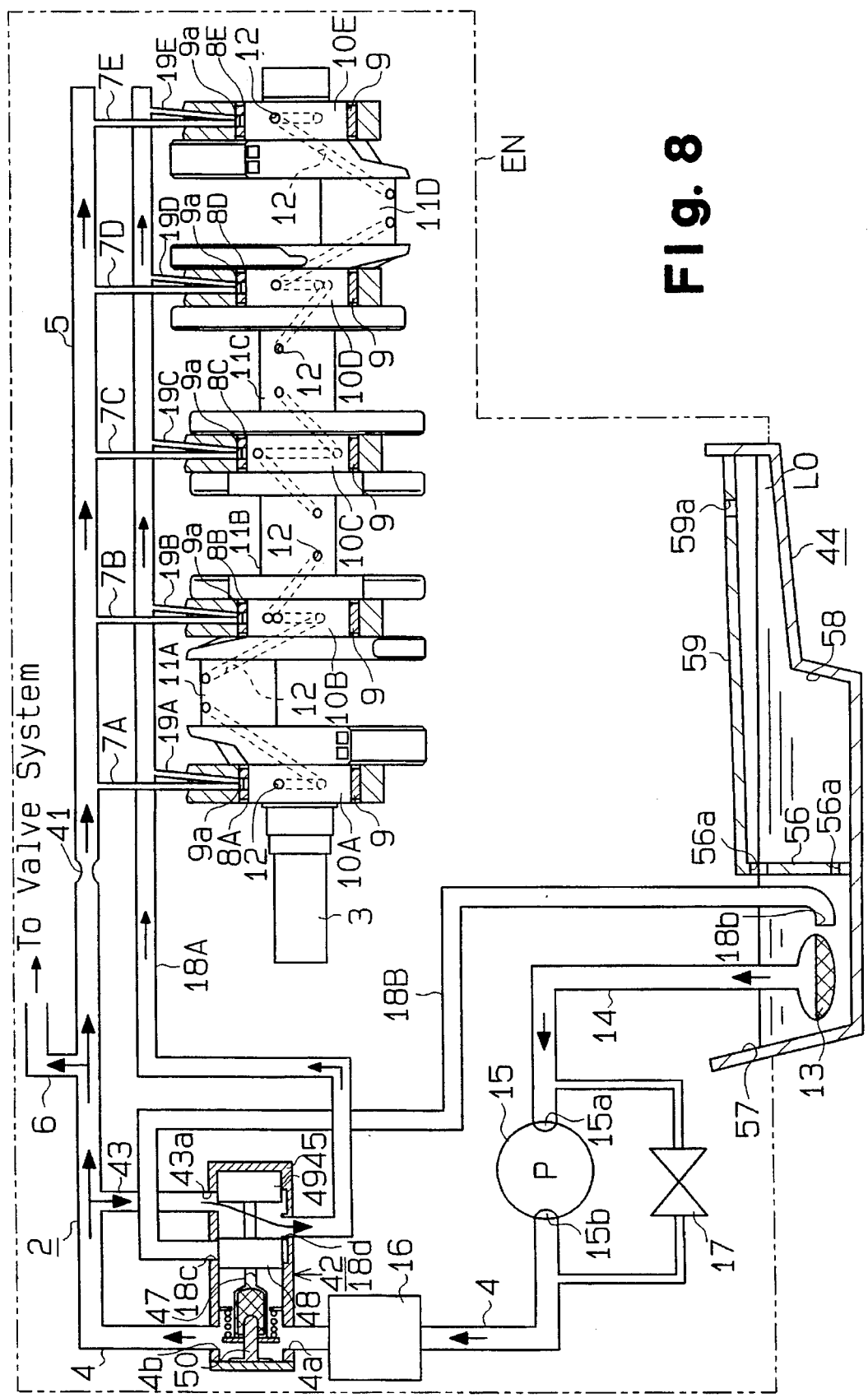

FIGS. 7 and 8 presents schematic structural diagrams of the lubricating apparatus for an engine according to this embodiment, which is similar to that of the first embodiment. The same reference numerals as used for the first embodiment will also be used to specify basically the same components in the third embodiment to avoid repeating their description. The following description will focus on the particular differences between the third embodiment and the first embodiment.

In this embodiment, the second oil control valve 23 of the first embodiment is eliminated from the strainer pipe 14, and the restrictor 20, oil tank 21 and check valve 22 in the first embodiment are eliminated from the oil recirculation passage 18.

Instead of those components, a restrictor 41 is provided midway in the crankshaft-system oil passage 5 upstream of the individual oil passages 7A to 7E in this embodiment. This restrictor 41 serves to make the pressure of the lubricating oil LO flowing to the crankshaft-system oil passage 5 from the main oil passage 4 relatively smaller than that flowing to the valve-system oil passage 6 from the main oil passage 4.

Disposed midway in both the main oil passage 4 and the oil recirculation passage 18 is a specially-designed oil switching valve 42 which will be described later. This oil switching valve 42 separates the oil recirculation passage 18 into two oil recirculation passages 18A and 18B. A communication passage 43 is provided between the main oil passage 4 and the oil switching valve 42, and connects the main oil passage 4 to the oil recirculation passage 18A or to the oil recirculation passage 18B. A downstream open end 18b of the oil recirculation passage 18B is located adjacent to the oil strainer 13 in a specially-designed oil pan 44 which will be described later.

The oil switching valve 42 in this embodiment is a temperature activated type valve. The oil switching valve 42 is activated when the engine EN is at a low temperature, whereupon the oil recirculation passage 18A communicates with the oil recirculation passage 18B. As the oil switching valve 42 switches to the opposite mode when the engine EN is at a high temperature, on the other hand, the communication passage 43 communicates the main oil passage 4 to the oil recirculation passage 18A.

Figure 9A:
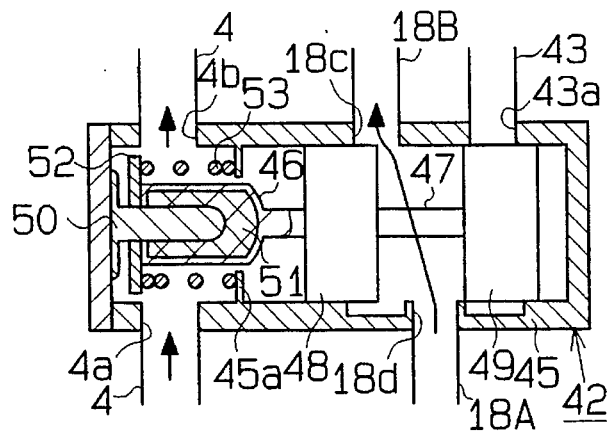
FIGS. 9A and 9B are diagrams illustrating the structure and action of an oil control valve.
Figure 9B:
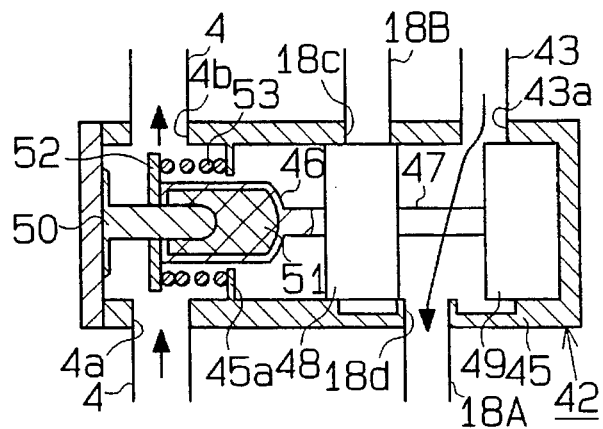

As shown in FIGS. 9A and 9B, the oil switching valve 42 has a hollow cylindrical housing 45 disposed so as to be in fluid communication with the midways of both the main oil passage 4 and the oil recirculation passages 18A and 18B and the communication passage 43. Two main ports 4a and 4b, which communicate with the main oil passage 4, are formed in the proximal end side (left-hand side in the diagrams) of the housing 45. Formed in the inner wall of the proximal end side of the housing 45 is a flange 45a extending inward. An operational shaft 46 is fitted in the flange 45a so that the shaft 46 can reciprocate in its axial direction. A spool 47 is formed integrally at the distal end side (right-hand side in the diagrams) of the operational shaft 46.

Two cylindrical valve pieces 48 and 49 are disposed on the spool 47 with a given interval therebetween. The valve pieces 48 and 49 separate the interior of the housing 45 into a passage associated with the main oil passage 4 and a passage associated with the oil recirculation passages 18A and 18B and the communication passage 43. Formed in the outer surface (at the top in the diagrams) of the housing 45 are a recirculation port 18c which communicates with the oil recirculation passage 18B and a communication port 43a which communicates with the communication passage 43. The ports 18c and 43a are openable and closable by the synchronous movements of the respective valve pieces 48 and 49.

An another recirculation port 18d, which communicates with the oil recirculation passage 18A, is formed in the outer surface of the housing 45. This recirculation port 18d is always open between the valve pieces 48 and 49. An elongated pin 50 is slidably inserted in the operational shaft 46 at the proximal end side of the housing 45. The proximal end of the pin 50 is fixed to the inner wall of one end of the housing 45. A thermo wax 51 is sealed, in contact with the pin 50, inside the operational shaft 46. This thermo wax 51 expands its volume as the temperature rises. A washer 52 is secured to the outer side of the proximal end of the operational shaft 46, with a spring 53 disposed between the washer 52 on the operational shaft 46 and the flange 45a on the housing 45. As the ambient temperature around the operational shaft 46 rises, the thermo wax 51 expands to drive the pin 50 out of the thermo wax 51.

When the engine EN is at a low temperature, therefore, the thermo wax 51 contracts so that the forward portion of the operational shaft 46 comes closer to the proximal end of the housing 45 (left hand side) due to the urging force of the spring 53, as shown in FIG. 9A. In this condition, the valve piece 48 is located to open the recirculation port 18c while the valve piece 49 is located to close the communication port 43a. That is, the oil recirculation passage 18A is connected to the oil recirculation passage 18B and the communication passage 43 is closed.

When the engine EN is at a high temperature, on the other hand, the thermo wax 51 expands so that the operational shaft 46 moves toward the distal end (right-hand side in the diagrams) of the housing 45, as shown in FIG. 9B. In this condition, the valve piece 48 is positioned to close the recirculation port 18c while the valve piece 49 is positioned to open the communication port 43a. The communication passage 43 is now open to be connected to the oil recirculation passage 18A. In this embodiment, the thermo wax 51 is designed to expand at "80° C.", moving the operational shaft 46 as shown in FIG. 9B.

Figure 10:
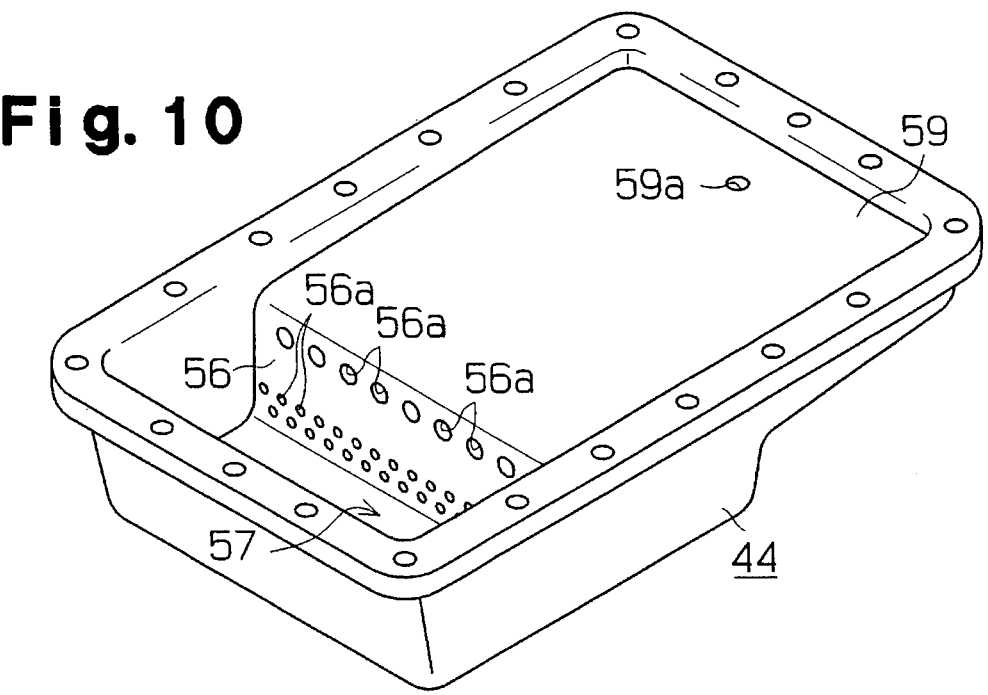

The oil pan 44 in this embodiment has a double-bath structure. As shown in FIGS. 7, 8 and 10, the interior of the oil pan 44 is separated into a small oil bath 57 and a large oil bath 58 by a partition 56. A plurality of small and large communication holes 56a are formed in the partition 56. The top of the large oil bath 58 is covered with a baffle plate 59 which has an air vent hole 59a formed in a part thereof. The lubricating oil LO is stored or reserved in the small oil bath 57 and the large oil bath 58, and can be recirculated between those oil baths 57 and 58 through the individual holes 56a in the partition 56. Disposed in the small oil bath 57 are the aforementioned oil strainer 13 and open end 18b of the oil recirculation passage 18B.

The function and operation of the thus structured lubricating apparatus will now be described below. The cylindrical housing 45 is disposed midway in the main oil passage 4 so that the operational shaft 46 is in fluid communication with the lubricating oil LO to provide for quick response of the thermo wax with changes in the temperature of the lubricating oil LO. As the oil pump 15 is activated, the lubricating oil LO retained in the oil pan 44 is pumped up through the oil strainer 13 from the small oil bath 57. The lubricating oil LO flowing down in the oil recirculation passage 18B directly returns to the small oil bath 57. Further, the lubricating oil LO, which falls down to the oil pan 44 via passages other than the oil recirculation passage 18 due to the gravitational pull on its dead weight, is shielded by the baffle plate 59 so that this lubricating oil LO returns to the small oil bath 57 without entering the large oil bath 58. This separation of the oil storage into a small oil bath 57 and a large oil bath 58 provides a shorter warm-up time for the lubricating oil LO.

When the engine EN is at a low temperature, the oil switching valve 42 functions to connect the oil recirculation passage 18A to the oil recirculation passage 18B and close the communication passage 43, as shown in FIGS. 7 and 9A. As the engine EN starts and the oil pump 15 is driven accordingly, the lubricating oil LO is pumped up to the main oil passage 4 from the oil pan 44. This lubricating oil LO is supplied to the crankshaft-system oil passage 5 and valve-system oil passage 6 under pressure. The lubricating oil LO sent to the crankshaft-system oil passage 5 under pressure is delivered to the individual bearings 8A to 8E via the respective oil passages 7A to 7E for lubrication. At the same time, part of the lubricating oil LO is supplied from the individual crank journals 10A to 10E to the adjoining crank pins 11A to 11D via the second oil supplying passage 12 and is further delivered to the moving parts such as the con'rods, pistons and cylinders for lubrication. Meantime, the lubricating oil LO sent to the valve-system oil passage 6 under pressure is supplied to the individual moving parts of the valve system for lubrication.

As the oil recirculation passage 18A is connected to the oil recirculation passage 18B and the communication passage 43 is closed by the oil switching valve 42 at the low temperature of the engine, the oil pressure in the oil recirculation passage 18A drops. Therefore, the suction force causes the lubricating oil LO to be sucked into the oil recirculation passage 18A from the oil grooves 9a of the individual bearings 8A to 8E via the respective oil passages 19A to 19E. The sucked lubricating oil LO directly returns to the oil pan 44 via the oil recirculation passages 18A and 18B. The returned lubricating oil LO is pumped up again via the oil strainer 13 and strainer pipe 14 by the oil pump 15, and is expelled to the main oil passage 4. Further, the lubricating oil LO is recirculated to the bearings 8A–8E from the crankshaft-system oil passage 5 via the respective oil passages 7A–7E.

At this time, as the lubricating oil LO is sucked out to the oil recirculation passage 18 from the oil grooves 9a, the oil pressure at each of the bearings 8A to 8E drops. This increases the amount of the lubricating oil LO which is recirculated to the oil recirculation passages 18A and 18B via the individual bearings 8A–8E from the crankshaft-system oil passage 5, while the oil films formed between the bearing metals 9 of those bearings 8A–8E and the crank journals 10A–10E are kept thin. The reduction in oil pressure in the oil grooves 9a of the bearings 8A–8E decreases the pressure loss of the oil pump 15, thus reducing the loss of the power to drive the oil pump 15.

Further, most of the lubricating oil LO heated at the individual bearings 8A to 8E is sucked out to the oil recirculation passage 18A to directly return to the oil pan 44. With the engine EN at a low temperature, therefore, the lubricating oil LO which is heated to some degree quickly returns to the inlet side of the oil pump 15 and is pumped out again therefrom. This helps the heating of the lubricating oil LO which is to be pumped out to the main oil passage 4 from the oil pump 15. Accordingly, the amount of the lubricating oil LO supplied to the crankshaft system will not be particularly reduced when the engine EN is at a low temperature. Part of the lubricating oil LO is effectively heated in the above manner by the crankshaft system which receives more heat than the valve system. It is therefore possible to shorten the warm-up time for the lubricating oil LO to be supplied to the individual moving parts including the bearings 8A to 8E of the engine EN.

What is more, the restrictor 41 in the crankshaft-system oil passage 5 will suppress the oil pressure of the lubricating oil LO, supplied to this passage 5, relatively lower than that supplied to the valve system in this embodiment. It is therefore possible to keep the oil films, formed between the bearings 8A to 8E and the crank journals 10A to 10E of the bearing metals 9, very thin. This will result in further reduction of the frictional loss at the individual portions including the bearings 8A–8E.

In addition, as this embodiment uses the oil pan 44 with the double-bath structure, the warm-up time for the lubricating oil LO can be shortened more effectively, which will be described below more specifically. The lubricating oil LO flowing through the oil recirculation passages 18A and 18B is returned to the small oil bath 57 and is pumped up again therefrom. Only a small amount of lubricating oil LO circulates via the individual holes 56a in the partition 56 between the small oil bath 57 and the large oil bath 58. It is therefore possible to reduce the diffusion of the heat, caused by the temperature differential applied between to the lubricating oil LO in the small oil bath 57 and the large oil bath 58. The temperature of the lubricating oil LO returning to the small oil bath 57 will rise more effectively. In this sense too, the warm-up time for the lubricating oil LO can be shortened more effectively.

Since the warm-up time for the lubricating oil LO can be shortened more effectively as mentioned above, the frictional loss at the individual moving parts including the bearings 8A to 8E can be reduced promptly. The reduction of the frictional loss will further improve the fuel mileage of the engine EN. In addition, the shortening of the warm-up time for the lubricating oil LO will improve the warm-up of the engine EN itself, thus improving fuel combustion. This will result in the improvement of the starting characteristic of the engine EN at a low temperature, contributing to an improvement in exhaust emissions at the time of the low-temperature starting.

When the engine EN warms up and its temperature exceeds "80° C.", the oil switching valve 42 is activated to open the communication passage 43, closing the oil recirculation passage 18B, as shown in FIGS. 8 and 9B. Consequently, part of the lubricating oil LO sent out to the main oil passage 4 is supplied to the oil recirculation passage 18A via the communication passage 43. That is, when the lubricating oil LO pumped out to the main oil passage 4 from the oil pump 15 is supplied to the crankshaft-system oil passage 5 and valve-system oil passage 6, part of that lubricating oil LO flows backward through the oil recirculation passage 18A via the communication passage 43. The counter-flowing lubricating oil LO is supplied to the individual bearings 8A to 8E from the oil recirculation passage 18A via the respective oil passages 19A to 19E. The lubricating oil LO supplied to the crankshaft-system oil passage 5 is augmented and delivered to the bearings 8A–8E via the respective oil passages 7A–7E.

When the engine EN is at a high temperature, therefore, the lubricating oil LO is supplied to the individual bearings 8A to 8E from both the crankshaft-system oil passage 5 and the oil recirculation passage 18A. This allows a large amount of lubricating oil LO to be delivered to the bearings 8A–8E and will secure a sufficient amount of lubricating oil LO to be supplied for effective lubrication at the bearings 8A–8E suitable for high temperature. In other words, frictional wear and burning of the individual bearings 8A–8E will be prevented.

A large amount of lubricating oil LO is also supplied from the crank journals 10A to 10E of the bearings 8A to 8E to the other moving parts, such as the adjoining crank pins 11A to 11D, con'rods, pistons and cylinders, via the second oil supplying passage 12. A sufficient amount of lubricating oil LO to be supplied to those other moving parts can be secured, thus also ensuring effective lubrication of the other moving parts. In this respect, it is possible to prevent insufficient lubrication in the crankshaft system including the other moving parts, after the warm-up of the engine EN is complete.

Fourth Embodiment

Figure 11:
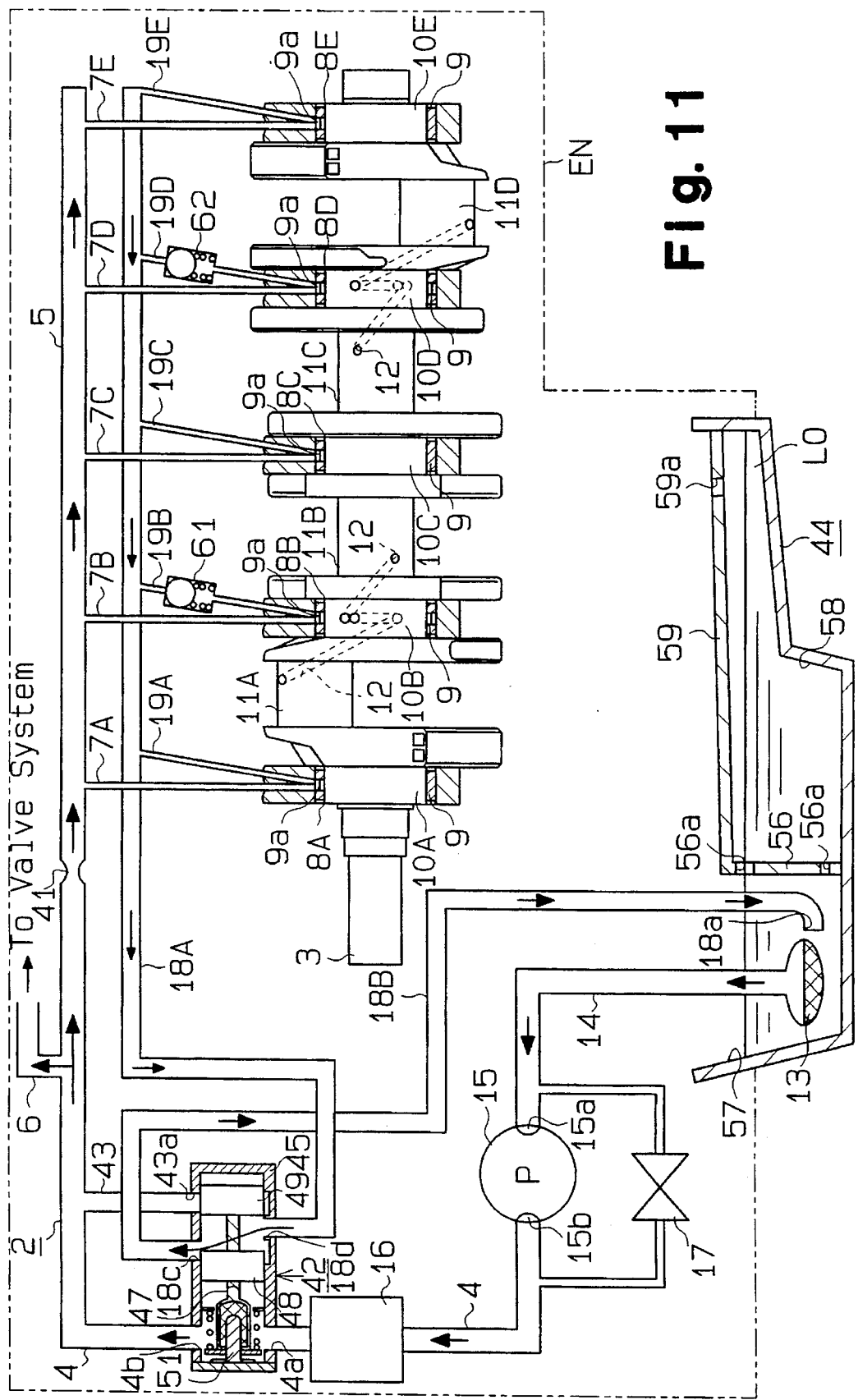
FIG. 11 is a schematic structural diagram showing a lubricating apparatus for an engine according to a fourth embodiment of the present invention.

A lubricating apparatus for an engine according to the fourth embodiment of this invention will now be described with reference to FIG. 11 wherein there is shown a schematic structural diagram of the lubricating apparatus for an engine according to this embodiment, which is similar to that of the third embodiment. The same reference numerals as used for the third embodiment will also be used to specify basically the same components in the fourth embodiment to avoid the repetition of their description. The following description will be centered on the particular differences between the fourth embodiment and the third embodiment.

With regard to the bearings 8A, 8C and 8E located at both ends and the center of the crankshaft 3, the second oil supplying passages 12 in the associated crank journals 10A, 10C and 10E are removed in this embodiment. Regarding the other bearings 8B and 8D, the second oil supplying passages 12 extending toward the adjoining crank pins 11A to 11D are formed only in the associated crank journals 10B and 10D. Check valves 61 and 62 are disposed in the midways of the oil passages 19B and 19D associated with those bearings 8B and 8D which correspond to the second oil supplying passages 12. Those check valves 61 and 62 inhibit only the flow of the lubricating oil LO in the direction from the bearings 8B and 8D to the oil recirculation passage 18A, and permit the countercurrent. Further, the oil grooves 9a are so formed at the bearings 8B and 8D so that each groove 9a runs fully around the associated bearing metal 9 in its inner wall in this embodiment.

Thus, this embodiment will have the same action and advantage as the third embodiment in shortening the warm-up time for the lubricating oil LO at a low temperature and accomplishing the effective lubrication by supplying a large amount of lubricating oil LO to the individual bearings 8A to 8E at a high temperature.

In addition, part of the lubricating oil LO supplied to some of the bearings, 8B and 8D, is delivered via the second oil supplying passages 12 to the other moving parts, such as the adjoining crank pins 11A to 11D, con'rods, pistons and cylinders, when the temperature of the engine EN is low and high.

As the check valves 61 and 62 are disposed in the oil passages 19B and 19D in association with the bearings 8B and 8D, the lubricating oil LO is inhibited from recirculating to the oil recirculation passages 18A and 18B via the respective oil passages 19B and 19D particularly at a low temperature. At a low temperature, therefore, the lubricating oil LO supplied to the bearings 8B and 8D via the crankshaft-system oil passage 5 will not recirculate to the oil recirculation passage 18A via the oil passages 19B and 19D. That is, part of the lubricating oil LO supplied to the bearings 8B and 8D via the oil passages 7B and 7D will not be sucked out to the oil recirculation passage 18A. Part of that lubricating oil LO is supplied to the other moving parts, such as the adjoining crank pins 11A to 11D, con'rods, pistons and cylinders, via the second oil supplying passages 12 for lubrication.

Further, as the oil grooves 9a of the bearings 8B and 8D run fully around the associated bearing metals 9 in the inner walls, the amount of the lubricating oil LO introduced to the second oil supplying passages 12 from the bearings 8B and 8D increases. It is therefore possible to secure a more sufficient amount of lubricating oil LO to be supplied to the other moving parts, such as the adjoining crank pins 11A to 11D, con'rods, pistons and cylinders, at a low temperature, as compared with the third embodiment, thus ensuring more effective lubrication. In this sense, insufficient lubrication at the other moving parts, such as the adjoining crank pins 11A to 11D, con'rods, pistons and cylinders, will be prevented when the engine EN starts at a low temperature.

When the engine EN is at a high temperature, the lubricating oil LO supplied to the crankshaft-system oil passage under pressure is delivered to the individual bearings 8A to 8E via the respective oil passages 7A to 7E. The lubricating oil LO which flows in the reverse direction in the oil recirculation passage 18A is supplied to the bearings 8A, 8C and 8E via the respective oil passages 19A, 19C and 19E. Further, the check valves 61 and 62 in the oil passages 19B and 19D permit the countercurrent, the lubricating oil LO flowing in the reverse direction in the oil recirculation passage 18A is also supplied to the bearings 8B and 8D via the respective oil passages 19B and 19D.

At a high temperature, therefore, the lubricating oil LO is supplied to the bearings 8A to 8E from both the crankshaft-system oil passage 5 and oil recirculation passage 18A. Consequently, a large amount of lubricating oil LO is supplied to the bearings 8A–8E, thus securing a sufficient amount of lubricating oil LO to be supplied and ensuring effective lubrication at the bearings 8A–8E suitable for a high temperature. The lubricating oil LO is also supplied to the other moving parts, such as the adjoining crank pins 11A to 11D, con'rods, pistons and cylinders, via the second oil supplying passages 12 from some of the bearings, 8B and 8D, thus ensuring proper lubrication.

Fifth Embodiment

A lubricating apparatus for an engine according to the fifth embodiment of this invention will now be described referring to FIG. 12 wherein there is shown a schematic structural diagram of the lubricating apparatus for an engine according to this embodiment, which is similar to that of the third embodiment. The following description will also be centered on the particular differences between this embodiment and the third embodiment.

The oil passages 7B and 7D which connect the bearings 8B and 8D to the crankshaft-system oil passage 5 in the third embodiment are removed in the fifth embodiment. Likewise, the oil passages 19B and 19D which connect the bearings 8B and 8D to the oil recirculation passage 18A are removed. Instead of those oil passages, the crankshaft-system oil passage 5 branches at the upstream of the restrictor 41, providing a second crankshaft-system oil passage 63 in this embodiment. Two other oil passages 64 and 65 are provided between the second crankshaft-system oil passage 63 and the bearings 8B and 8D, and connect the passage 63 to the bearings 8B and 8D. The inside diameters of those oil passages 64 and 65 are set larger than those of the other oil passages 7A, 7C, 7E, 19A, 19C and 19E. This embodiment is designed in such a way that the second crankshaft-system oil passage 63 and the oil passages 64 and 65 permit a larger amount of lubricating oil LO to be supplied to the bearings 8B and 8D than to the other bearings 8A, 8C and 8E. In this embodiment, the oil passages 19A, 19C and 19E are provided only for those bearings 8A, 8C and 8E.

Thus, this embodiment will have almost the same action and advantage as the fourth embodiment in shortening the warm-up time for the lubricating oil LO at a low temperature and accomplishing the effective lubrication by supplying a large amount of lubricating oil LO to the individual bearings 8A to 8E at a high temperature.

In addition, part of the lubricating oil LO supplied to some of the bearings, 8B and 8D, is delivered via the Second oil supplying passages 12 to the other moving parts, such as the adjoining crank pins 11A to 11D, con'rods, pistons and cylinders, when the temperature of the engine EN is low and high. Further, the second crankshaft-system oil passage 63 and oil passages 64 and 65 allow a larger amount of lubricating oil LO to be supplied to the bearings 8B and 8D associated with the second oil supplying passages 12 than to the other bearings 8A, 8C and 8E. This increases the amount of lubricating oil LO to be supplied to the other moving parts, such as the crank pins 11A to 11D, con'rods, pistons and cylinders, via the second oil supplying passages 12.

Regardless of whether the temperature of the engine EN is low or high, therefore, a more sufficient amount of lubricating oil LO to be supplied to the other moving parts, such as the crank pins 11A to 11D, con'rods, pistons and cylinders, can be secured than that in the third embodiment, thus ensuring more effective lubrication. In this sense, insufficient lubrication at the other moving parts, such as the crank pins 11A to 11D, con'rods, pistons and cylinders, will be prevented when the engine EN starts at a low temperature and the warm-up time of the engine EN is complete.

Furthermore, only the bearings 8A, 8C and 8E which are not associated with the second oil supplying passages 12, are connected via the respective oil passages 19A, 19C and 19E to the oil recirculation passage 18A in this embodiment. When the engine EN is at a low temperature, therefore, the lubricating oil LO supplied to those bearings 8A, 8C and 8E recirculates via the oil recirculation passage 18A. When the engine EN is at a high temperature, part of the lubricating oil LO pumped out to the main oil passage 4 from the oil pump 15 is supplied to the bearings 8A, 8C and 8E via the communication passage 43, the oil recirculation passage 18A and the respective oil passages 19A, 19C and 19E. With the engine EN at a high temperature, therefore, the supply amount of the lubricating oil LO increases at the bearings 8A, 8C and 8E from which the lubricating oil LO is not supplied to the other moving parts.

Accordingly, when the engine EN is at a high temperature, the sufficient amount of lubricating oil LO can be secured even at the bearings 8A, 8C and 8E from which the lubricating oil LO need not be supplied to the other moving parts, thus ensuring effective lubrication. In this sense, insufficient lubrication at the bearings 8A, 8C and 8E will be prevented when the temperature of the engine EN is high.

Sixth Embodiment

Figure 13:
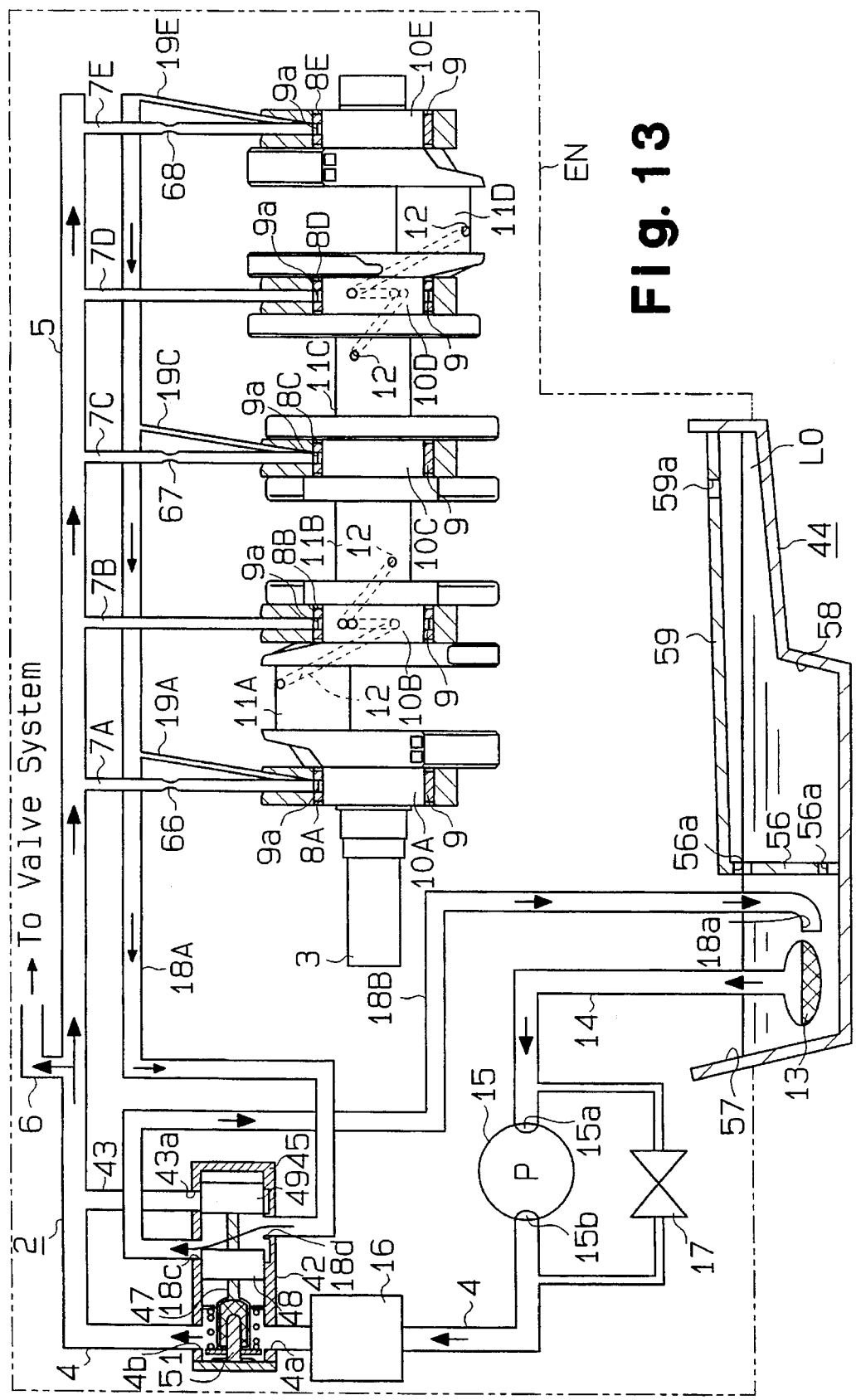
FIG. 13 is a schematic structural diagram showing a lubricating apparatus for an engine according to a sixth embodiment of the present invention.

A lubricating apparatus for an engine according to the sixth embodiment of this invention will now be described referring to FIG. 13 wherein there is shown a schematic structural diagram of the lubricating apparatus for an engine according to this embodiment, which is similar to that of the third embodiment. The following description will also be centered on the particular differences between this embodiment and the third embodiment.

In this embodiment, the oil passages 19B and 19D in the third embodiment, which connect the bearings 8B and 8D to the oil recirculation passage 18A, are removed. Also removed in this embodiment is the restrictor 41 which provided in the crankshaft-system oil passage 5 in the third embodiment. Instead, the inside diameters of the oil passages 7A to 7E provided between the crankshaft-system oil passage 5 and the bearings 8A to 8E are set relatively large in this embodiment. Restrictors 66, 67 and 68 are disposed midways in the oil passages 7A, 7C and 7E corresponding to the bearings 8A, 8C and 8E which are not associated with the second oil supplying passages 12. In other words, no means to restrict the flow rate of the oil, such as restrictors, is provided in the oil passages 7B and 7D associated with the bearings 8B and 8D, respectively.

The sixth embodiment is designed in such a manner that the oil passages 7A–7E and the restrictors 66–68 make the amount of the lubricating oil LO to be supplied to the bearings 8B and 8D larger than that of the lubricating oil LO to be supplied to the other bearings 8A, 8C and 8E. Only for the bearings 8A, 8C and 8E which are not associated with the second oil supplying passages 12 are provided the oil passages 19A, 19C and 19E, which connect those bearings 8A, 8C and 8E to the oil recirculation passage 18A.

Thus, this embodiment will have almost the same action and advantage as the third embodiment in shortening the warm-up time for the lubricating oil LO at a low temperature and accomplishing the effective lubrication by supplying a large amount of lubricating oil LO to the individual bearings 8A to 8E at a high temperature.

In addition, part of the lubricating oil LO supplied to some of the bearings, 8B and 8D, is delivered via the second oil supplying passages 12 to the other moving parts, such as the adjoining crank pins 11A to 11D, con'rods, pistons and cylinders, when the temperature of the engine EN is low and high in this embodiment too. Further, no restrictors are provided in the oil passages 7B and 7D associated with the bearings 8B and 8D, and the inside diameters of those oil passages 7B and 7D are set large. Therefore, the lubricating oil LO is supplied more to the bearings 8B and 8D than to the other bearings 8A, 8C and 8E. This increases the amount of lubricating oil LO to be supplied to the other moving parts, such as the crank pins 11A to 11D, con'rods, pistons and cylinders, via the second oil supplying passages 12.

Regardless of whether the temperature of the engine EN is low or high, therefore, a more sufficient amount of lubricating oil LO to be supplied to the other moving parts, such as the crank pins 11A to 11D, con'rods, pistons and cylinders, can be secured than that in the third embodiment, thus ensuring more effective lubrication. In this sense, insufficient lubrication at the other moving parts, such as the crank pins 11A to 11D, con'rods, pistons and cylinders, will be prevented when the engine EN starts at a low temperature and the warm-up time of the engine EN is complete.

Furthermore, only the lubricating oil LO, which has been supplied to the bearings 8A, 8C and 8E that are not associated with the second oil supplying passages 12, recirculate through the oil recirculation passage 18A in this embodiment too when the engine EN is at a low temperature. When the engine EN is at a high temperature, part of the lubricating oil LO pumped out to the main oil passage 4 is supplied to the bearings 8A, 8C and 8E via the communication passage 43, the oil recirculation passage 18A and the respective oil passages 19A, 19C and 19E. With the engine EN at a high temperature, therefore, the supply amount of the lubricating oil LO increases at the bearings 8A, 8C and 8E from which the lubricating oil LO is not supplied to the other moving parts.

Accordingly, when the engine EN is at a high temperature, the sufficient amount of lubricating oil LO can be secured even at the bearings 8A, 8C and 8E from which the lubricating oil LO need not be supplied to the other moving parts, thus ensuring effective lubrication. In this sense, insufficient lubrication at the bearings 8A, 8C and 8E will be prevented when the temperature of the engine EN is high.

Seventh Embodiment

A lubricating apparatus for an engine according to the seventh embodiment of this invention will now be described referring to FIGS. 14 to 17. The same reference numerals as used for the first embodiment will also be used to specify similar components in the seventh embodiment to avoid repeating their description. The following description will be centered on the particular differences between this embodiment and the first embodiment.

In this embodiment, an oil return passage 81 for returning the lubricating oil LO, supplied to the individual bearings 8A to 8E, to the oil pan 1 is provided in place of the oil recirculation passage 18 in the first embodiment. The outlet port of this oil return passage 81 is located close to the oil strainer 13. A first temperature activated oil control valve 82 is provided midway in the oil return passage 81. This oil control valve 82 is a two-way valve of a temperature sensitive type whose structure is similar to that of the second oil control valve 23 in the first embodiment. The oil control valve 82 is open only when the engine EN is at a low temperature, permitting the lubricating oil LO to return to the oil pan 1 via the oil return passage 81. When the engine EN is at a high temperature, the oil control valve 82 is closed to block the flow of the lubricating oil LO in the oil return passage 81.

Figure 15:
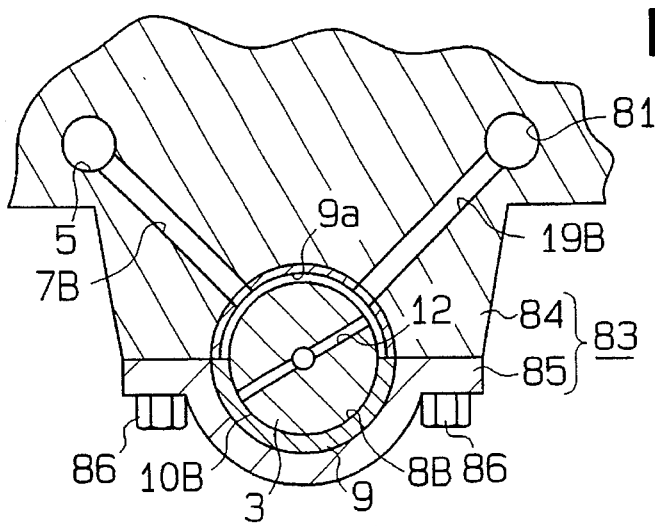

FIG. 15 depicts a cross section showing one bearing 8B of the crankshaft 3. This bearing 8B is held by a bearing housing 83. The bearing housing 83 is designed to be separable into two components, a housing body 84 on the crankcase side and a shaft holder 85, which hold the crank journal 10B. Both members 84 and 85 are fastened with the crank journal 10B in between by a pair of bolts 86. The bearing metal 9 is provided at the bearing 8B, and the oil groove 9a is so formed to run half around the bearing metal 9 in its inner wall. Connected to this oil groove 9a are the oil passages 7B and 19B, which extend from the crankshaft-system oil passage 5 and the oil return passage 81 formed in the housing body 84. The second oil supplying passage 12 is formed in the crankshaft 3. This structure is repeated for the other bearings 8A and 8C–8E.

Figure 14:
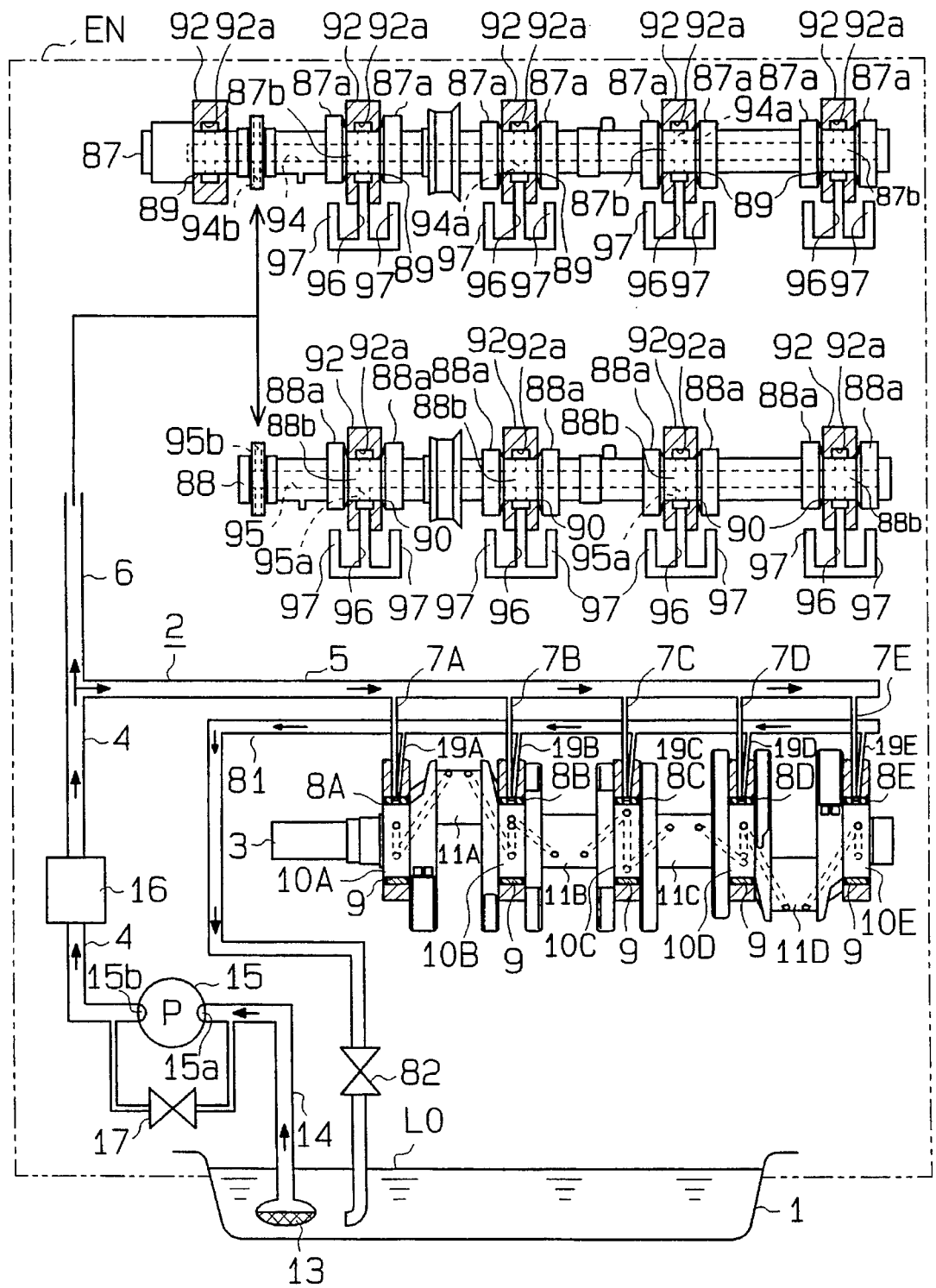
Figure 16:
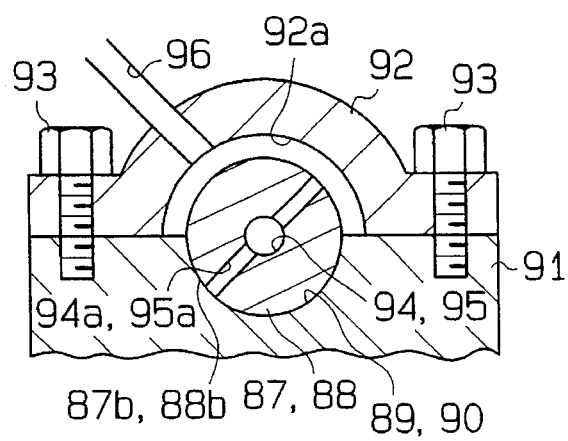

As shown in FIGS. 14 and 16, the valve system of this embodiment includes a camshaft 87 on the air inlet side and a camshaft 88 on the exhaust side. A plurality of cams 87a and 88a and a plurality of journals 87b and 88b are disposed in parallel on the outer surfaces of the camshafts 87 and 88, respectively. The camshafts 87 and 88 are rotatably supported at the respectively journals 87b and 88b by a plurality of associated bearings 89 and 90. Each of the bearings 89 and 90 comprises a cylinder head 91 and a bearing cap 92, which are fastened with the journal 87b or 88b of the associated camshaft 87 or 88 in between by a pair of bolts 93. An oil groove 92a is formed in the inner wall of the bearing cap 92 in each bearing 89 or 90. Shaft oil passages 94 and 95 each extending in the axial direction are respectively formed inside the camshafts 87 and 88. Both ends of each shaft oil passage 94 or 95 are closed.

Oil holes 94a and 95a are formed in the respective journals 87b and 88b to connect the oil grooves 92a of the bearings 89 and 90 to the associated shaft oil passages 94 and 95. Oil ports 94b and 95b for connecting the shaft oil passages 94 and 95 to the valve-system oil passage 6 are formed at one end in the camshafts 87 and 88. The lubricating oil LO supplied to the valve-system oil passage 6 under pressure is introduced into the shaft oil passages 94 and 95 through the respective oil ports 94b and 95b, and is further supplied to the bearings 89 and 90 through the respective oil holes 94a and 95a.

Figure 17:
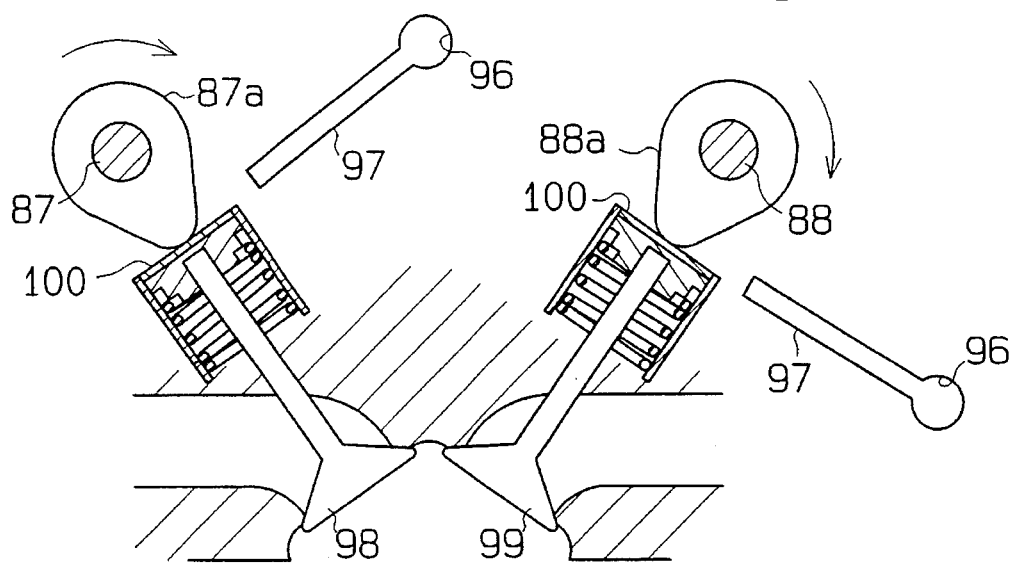

A relief oil passage 96 is formed in the bearing cap 92 of each of the bearings 89 and 90 to provide connection with the oil groove 92a. A pair of oil jet pipes 97 are provided at the distal end sides of the associated relief oil passages 96, adjacent to the respective bearings 89 and 90 in the vicinity of the associated cams 87a and 88a. Those oil jet pipes 97 serve to spray the lubricating oil LO and their distal ends are directed toward the cams 87a and 88a. As shown in FIG. 17, an inlet valve 98 and an exhaust valve 99 are provided in association with the camshafts 87 and 88, and shims 100 provided at the tops of the valves 98 and 99 are pressed against the respective cams 87a and 88a. The distal ends of the oil jet pipes 97 are directed toward where the cams 87a and 88a contact the respective shims 100, so as to be associated with the rotational directions of the cams 87a and 88a in accordance with the movement of the camshafts 87 and 88.

The function of the thus structured lubricating apparatus for an engine will now be described. When the temperature of the engine EN is low, the first oil control valve 82 is open. As the engine EN starts, the lubricating oil LO, pumped up to the main oil passage 4 from the oil pan 1 by the oil pump 15, is supplied to the crankshaft-system oil passage 5 and valve-system oil passage 6 under pressure.

The lubricating oil LO, supplied to the crankshaft-system oil passage 5 under pressure, is delivered to the individual bearings 8A to 8E via the respective oil passages 7A to 7E for lubrication. The lubricating oil LO is also supplied to the other moving parts, such as the crank pins 11A to 11D, con'rods, pistons and cylinders, from the respective crank journals 10A to 10E for lubrication.

As the first oil control valve 82 is open at this low temperature, the lubricating oil LO supplied to the bearings 8A to 8E flows from the oil grooves 9a to the oil return passage 81 via the respective oil passages 19A to 19E, so as to relieve the oil pressure at the bearings 8A to 8E. The relieved lubricating oil LO directly returns to the oil pan 1 via the passage 81 and the first oil control valve 82. This lubricating oil LO that has returned directly to the oil pan 1 will be pumped up again to the main oil passage 4 by the oil pump 15 to be supplied to the crankshaft-system oil passage 5 and valve-system oil passage 6 under pressure.

At this time, as the lubricating oil LO is relieved to the oil return passage 81 from the oil grooves 9a at the bearings 8A to 8E, the oil pressure drops. This increases the amount (volume) of the lubricating oil LO, which is supplied to the individual bearings 8A–8E from the crankshaft-system oil passage 5 to be relieved to the oil return passage 81, thus effectively cooling the bearing metals at the bearings 8A–8E. Meantime the oil films formed between the bearing metals 9 of those bearings 8A–8E and the crank journals 10A–10E are kept thin, thus reducing the frictional loss. The reduction in oil pressure in the oil grooves 9a of the bearings 8A–8E decreases the pressure loss of the oil pump 15, thus reducing the loss of the power to drive the oil pump 15.

Further, the lubricating oil LO, heated at the individual bearings 8A to 8E and relieved to the oil return passage 81, returns near the oil strainer 13 in the oil pan 1. Accordingly, the lubricating oil LO heated at the bearings 8A–8E will be pumped up to the main oil passage 4 by priority by the oil pump 15, and will be supplied again to the bearings 8A–8E via the crankshaft-system oil passage 5. With the engine EN at a low temperature, therefore, the lubricating oil LO heated to some degree circulates through the crankshaft-system oil passage 5, the bearings 8A–8E, the oil return passage 81, thus helping heating the lubricating oil LO.

It is to be noted that the amount of the lubricating oil LO supplied to the crankshaft system will not be reduced when the engine EN is at a low temperature. Part of the lubricating oil LO is effectively heated in the above manner by way of the crankshaft system which can receive more heat than the valve system. It is therefore possible to shorten the warm-up time for the lubricating oil LO to be supplied to the individual moving parts including the bearings 8A to 8E of the engine EN. The shorter warm-up time for the lubricating oil LO will promptly reduce the frictional loss at the individual moving parts including the bearings 8A to 8E. The reduction of the frictional loss will improve the fuel mileage of the engine EN. In addition, the shortening of the warm-up time for the lubricating oil LO will improve the warm-up of the engine EN itself, thus improving fuel combustion. This will result in the improvement of the starting characteristic of the engine EN at a low temperature, contributing to the improvement of the exhaust emission at the time of the low-temperature starting.

The lubricating oil LO, supplied to the valve-system oil passage 6 under pressure at a low temperature, is delivered to the individual moving parts of the valve system for lubrication. More specifically, the lubricating oil LO supplied to the valve-system oil passage 6 under pressure is led to the individual shaft oil passages 94 and 95 via the oil ports 94b and 95b of the camshafts 87 and 88, and is then supplied via the oil holes 94a and 95a to the bearings 89 and 90 for lubrication. Part of the lubricating oil LO supplied to the bearings 89 and 90 is sprayed on the contact portions between the cams 87a and 88a and the shims 100 from the oil grooves 92a through the relief oil passages 96 and the oil jet pipes 97. That is, part of the lubricating oil LO supplied to the bearings 89 and 90 is relieved to the outside through the relief oil passages 96.

At a low temperature, as the oil pressure in the crankshaft-system oil passage 5 falls, the oil pressure in the valve-system oil passage 6 also drops. Since the lubricating oil LO is relieved from the bearings 89 and 90, however, the supply amount of lubricating oil LO to the bearings 89 and 90 will be sufficient for lubrication purposes. It is therefore possible to accomplish both the cooling and the reduction in frictional loss at the bearings 89 and 90 of the camshafts 87 and 88 as in the case of the bearings 8A–8E of the crankshaft 3. What is more, as the lubricating oil LO is sprayed on the contact portions between the cams 87a and 88a and the shims 100 in this embodiment, lubricating oils are mixed at those contact portions so that the frictional loss at the oil mixed area may also be reduced.

According to the lubricating apparatus of this embodiment, the total results of supplying the lubricating oil LO to the crankshaft system and valve system will be a significant reduction in pressure loss in the oil pump 15, an effective reduction in frictional loss at each lubricating portion of the crankshaft system and valve system, and the improvement of the warm-up characteristic of the lubricating oil LO. Those effects will significantly improve the fuel mileage when the engine EN is at a low temperature.

When the engine EN is warmed up to a high temperature, the first temperature activated oil control valve 82 will close. Consequently, the lubricating oil LO supplied to the bearings 8A to 8E is not relieved to the oil return passage 81 from the respective oil passages 19A to 19E, so that the lubricating oil LO will not return to the oil pan 1 through the oil return passage 81, etc.

When the first oil control valve 82 is closed, the oil pressure at the bearings 8A to 8E and in the crankshaft-system oil passage 5 increases, and the oil pressure in the valve-system oil passage 6 and at the bearings 89 and 90 increases accordingly. As a result, the oil films at the bearings 8A–8E and the bearings 89 and 90 become thick, thus preventing a shortage of the oil films at the bearings 8A–8E, 89 and 99 under high temperature conditions. In addition, as the amount of the lubricating oil LO supplied to the contact portions between the cams 87a and 88a and the shims 100 increases, it is possible to prevent an increase in frictional loss originated from the transition of the lubrication state at the contact portions to the oil mixed lubrication state, and wear or burning at the contact portions between the members 87a, 88a and 100.

Eighth Embodiment

Figure 18:
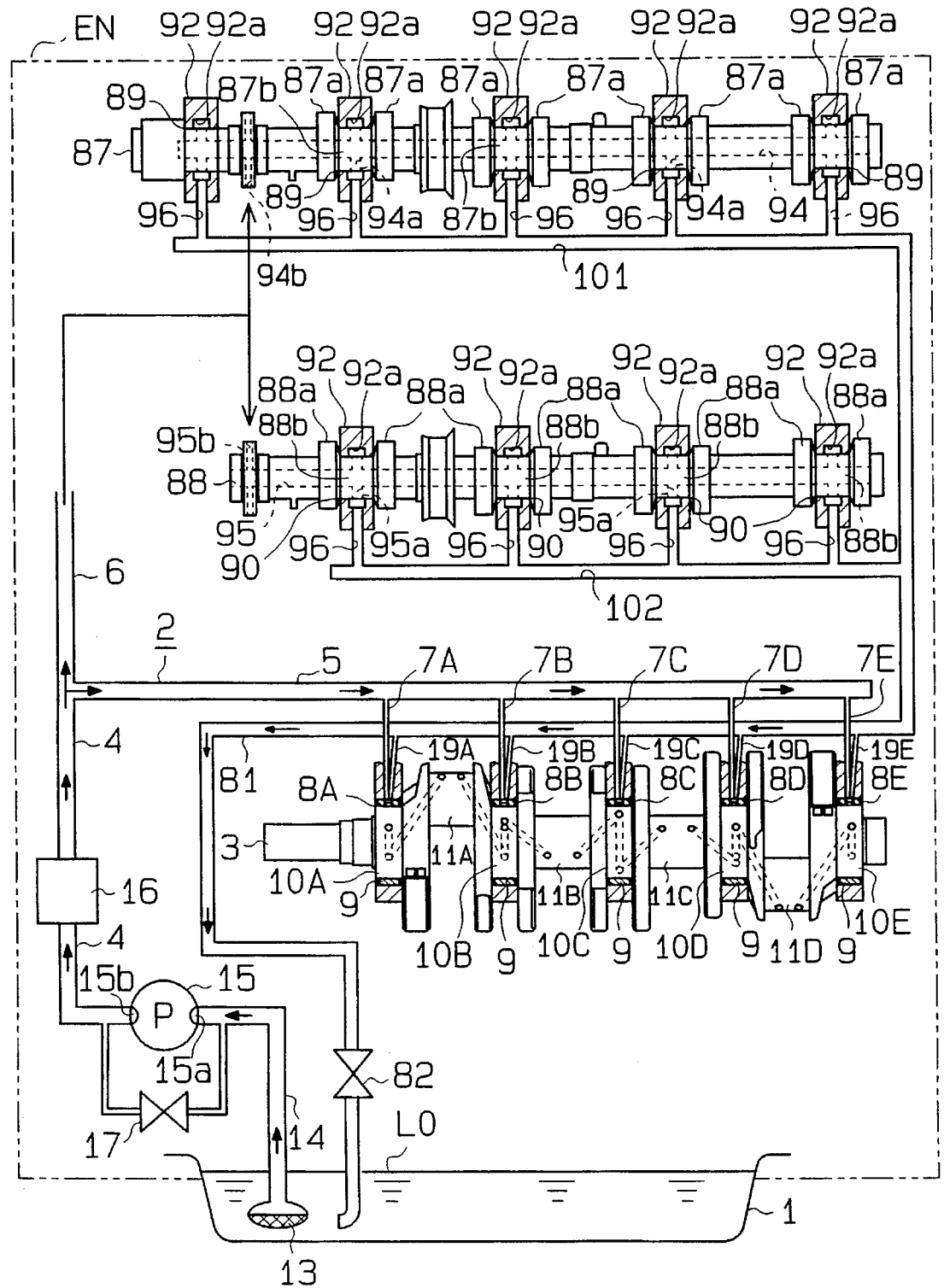
FIG. 18 is a schematic structural diagram showing a lubricating apparatus for an engine according to an eighth embodiment of the present invention.

A lubricating apparatus for an engine according to the eighth embodiment of this invention will now be described referring to FIG. 18. The same reference numerals as used for the seventh embodiment will also be used to specify similar components in this embodiment to avoid repeating their description. The following description will focus on the particular differences between this embodiment and the seventh embodiment. This embodiment differs from the seventh embodiment in that the relief oil passages 96 at the bearings 89 and 90 of the valve system are connected to the oil return passage 81 of the crankshaft system through oil return passages 101 and 102.

According to the lubricating apparatus of this embodiment, therefore, when the engine EN is running at a low temperature, the first oil control valve 82 is closed to provide the same function and advantage as described for the seventh embodiment. In addition, the lubricating oil LO, supplied to the bearings 89 and 90 of the valve system, is heated and relieved to the oil return passage 81 of the crankshaft system through the relief oil passages 96 and the oil return passages 101 and 102. The lubricating oil LO relieved from the valve system and the lubricating oil LO relieved from the bearings 8A to 8E of the crankshaft system join and return directly to the oil pan 1. The returned lubricating oil LO is pumped up again by the oil pump 15 and is supplied to the individual moving parts of the crankshaft system and valve system. This further improves the heating of the lubricating oil LO, thus further improving the warm-up characteristic of the lubricating oil LO and the fuel mileage of the engine EN.

When the engine EN is running at a high temperature, the first oil control valve 82 closes, which inhibits the lubricating oil LO from the bearings 89 and 90 of the valve system from being relieved as in the case of the bearings 8A–8E of the crankshaft system. Thus, the oil pressure at the bearings 8A–8E and in the crankshaft-system oil passage 5 and the oil pressure at the bearings 89 and 90 and in the valve-system oil passage 6 both increase, making the oil films at the bearings 8A–8E, 89 and 90 thicker. This will provide a greater effect on preventing the shortage of the oil films at the bearings 8A–8E, 89 and 99 under high temperature conditions and the burning at the contact portions between the cams 87a and 88a and the shims 100, resulting in the further improvement of the reliability of the lubricating apparatus.

Ninth Embodiment

A lubricating apparatus for an engine according to the ninth embodiment of this invention will now be described referring to FIGS. 19A, 19B, 20A and 20B.

The same reference numerals as used for the seventh embodiment will also be used to specify basically the same components in this embodiment to avoid repeating their description. The following description will be centered on the particular difference between this embodiment and the seventh embodiment.

Figure 19A:
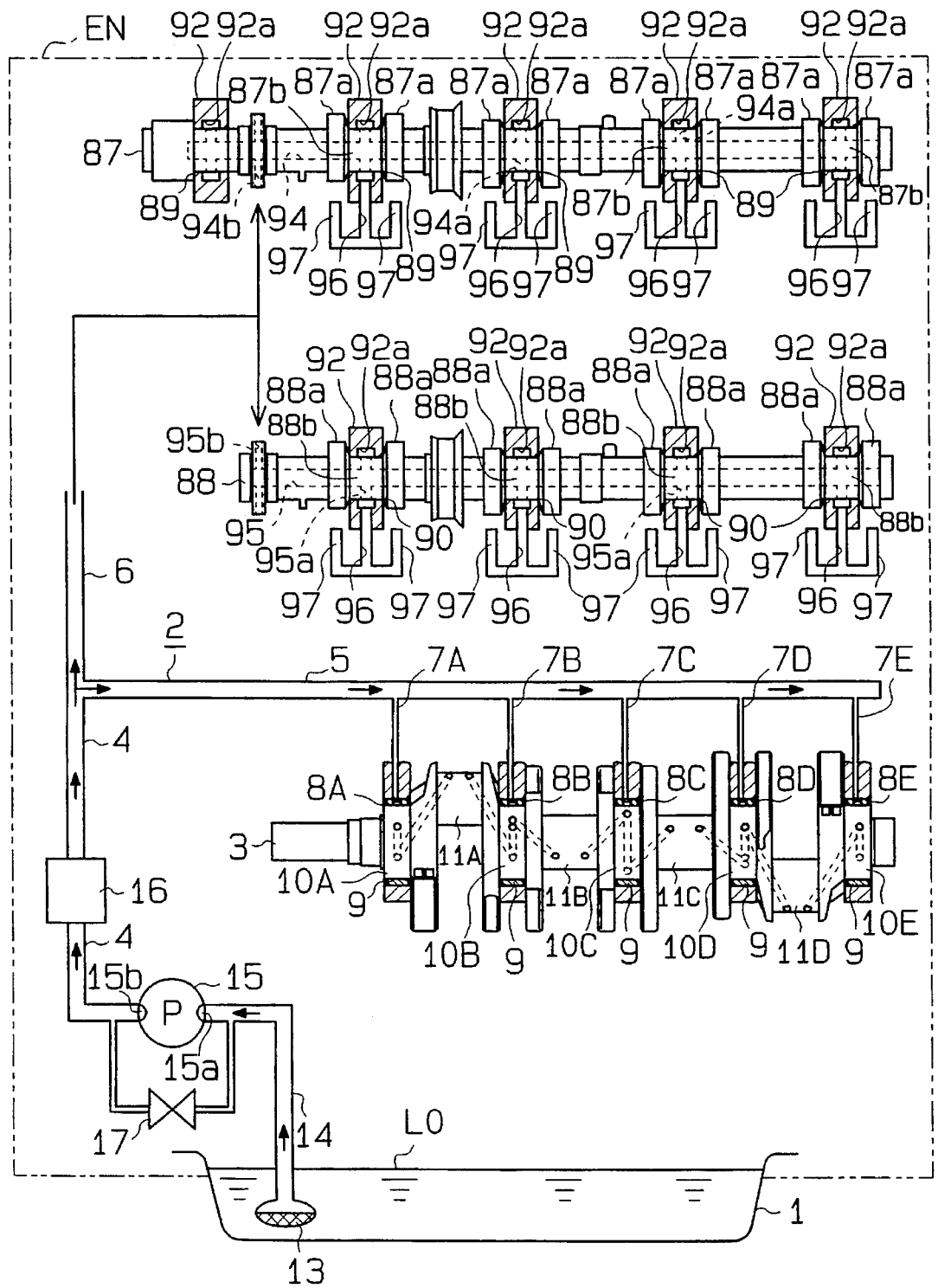
Figure 19B:
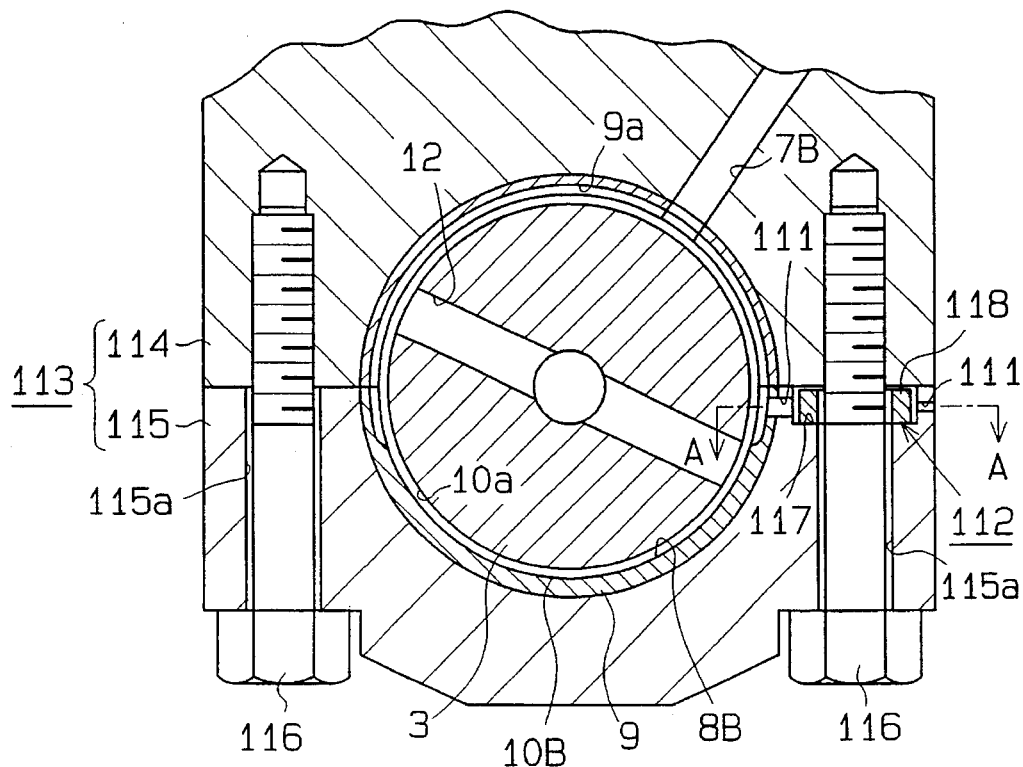

This embodiment differs from the seventh embodiment in the structures of the oil return passage (111) and the first oil control valve (112). In this embodiment, the oil passages 19A to 19E, oil return passage 81 and first oil control valve 82 in FIG. 14 are removed as shown in FIG. 19A. Instead, an oil return passage 111 and a first oil control valve 112 are provided in association with each of the bearings 8A to 8E of the crankshaft 3. FIG. 19B presents a cross-sectional view showing a bearing housing 113 which constitutes one bearing 8B of the crankshaft 3. This bearing housing 113 is designed to be separable into two components, a housing body 114 on the crankcase side and a steel shaft holder 115, which hold the crank journal 10B. Both members 114 and 115 are fastened with the crank journal 10B in between by a pair of bolts 116. The bearing metal 9 having an oil groove 9a is provided at the bearing 8B. Connected to this oil groove 9a is the oil passage 7B, which extends from the crankshaft-system oil passage 5 formed in the housing body 114. The second oil supplying passage 12, which is connected to the crank journal 10B, is formed in the crankshaft 3. An oil groove 10a is formed to run all around that crank journal 10B.

Figure 20A:
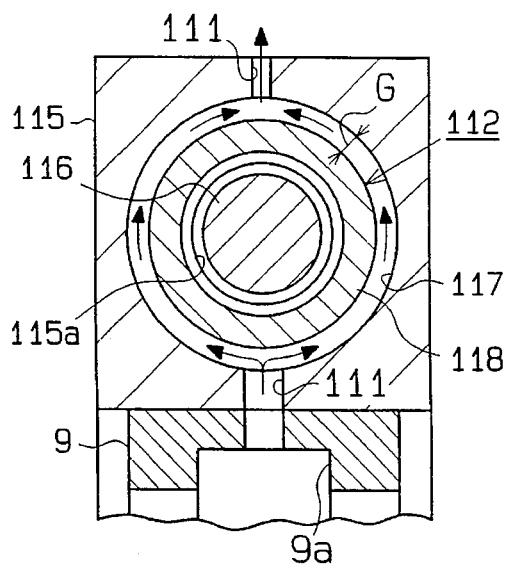
Figure 20B:
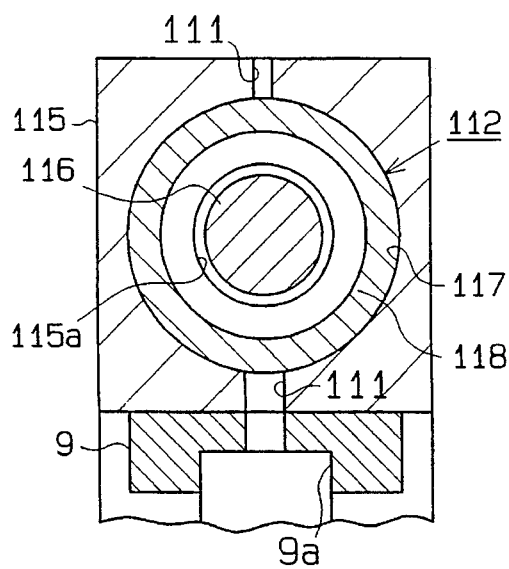

As shown in FIGS. 19B, 20A and 20B, bolt holes 115a are formed in the shaft holder 115 for the insertion of both bolts 116. A communication groove 117 annular around one of the bolt holes 115a is formed at that end face of the shaft holder 115 which meets the housing body 114. The oil return passage 111, which penetrates the communication groove 117 and the bearing metal 9, is formed in association with that groove 117. One end of this oil return passage 111 is open to the outside of the shaft holder 115, and the other end is open to the oil groove 9a of the bearing metal 9. The inside diameter of the opening of the oil return passage 111 on the former side is set smaller than that of the opening on the latter side.

A ring 118 fitted over the associated bolt 116, serving as a thermal expansion piece, is located in the annular communication groove 117. In this embodiment, the ring 118 is made of a material having a higher coefficient of thermal expansion than the steel shaft holder 115. This ring 118 contacts at a low temperature to provide a gap G between itself and the communication groove 117, freeing this groove 117, as shown in FIG. 20A. At a high temperature, the ring 118 thermally expands to eliminate the gap G between itself and the groove 117, closing this groove 117, as shown in FIG. 20B. The above-described structure also applies to the other bearings 8A, and 8C–8E.

According to the lubricating apparatus of this embodiment, therefore, when the engine EN is running at a low temperature, each ring 118 contracts to free the communication groove 117 to open the first oil control valve 112 as shown in FIG. 20A. Part of the lubricating oil LO supplied to the individual bearings 8A to 8E via the respective oil passages 7A to 7E is therefore relieved outside the shaft holders 115 after passing through the oil grooves 9a of the bearing metals 9, the oil grooves 10a of the crank journals 10A to 10E, the communication grooves 117 of the shaft holders 115 and the oil return passages 111. The relieved lubricating oil LO returns directly to the oil pan 1. When the engine EN is running at a high temperature, on the other hand, each ring 118 thermally expands to close the communication groove 117, closing the first oil control valve 112 as shown in FIG. 20B. Part of the lubricating oil LO supplied to the individual bearings 8A–8E via the respective oil passages 7A–7E is not therefore relieved outside through the oil return passages 111 of the shaft holders 115. This embodiment thus has the same action and advantage as the seventh embodiment.

In the ninth embodiment, the first oil control valve 112 has a simple structure obtained by attaching the ring 118 using the bearing housing 113 and the bolt 116, which are of ordinary types. The first oil control valve 112 can therefore be structured easily, eliminating the need for a complicated first oil control valve, so that the whole lubricating apparatus will be manufactured relatively compact and easily.

Tenth Embodiment

A lubricating apparatus for an engine according to the tenth embodiment of this invention will now be described referring to FIGS. 21 through 24.

The same reference numerals as used for the seventh embodiment will also be used to specify basically the same components in this embodiment to avoid repeating their description. The following description will be centered on the particular difference between this embodiment and the seventh embodiment.

Figure 21:
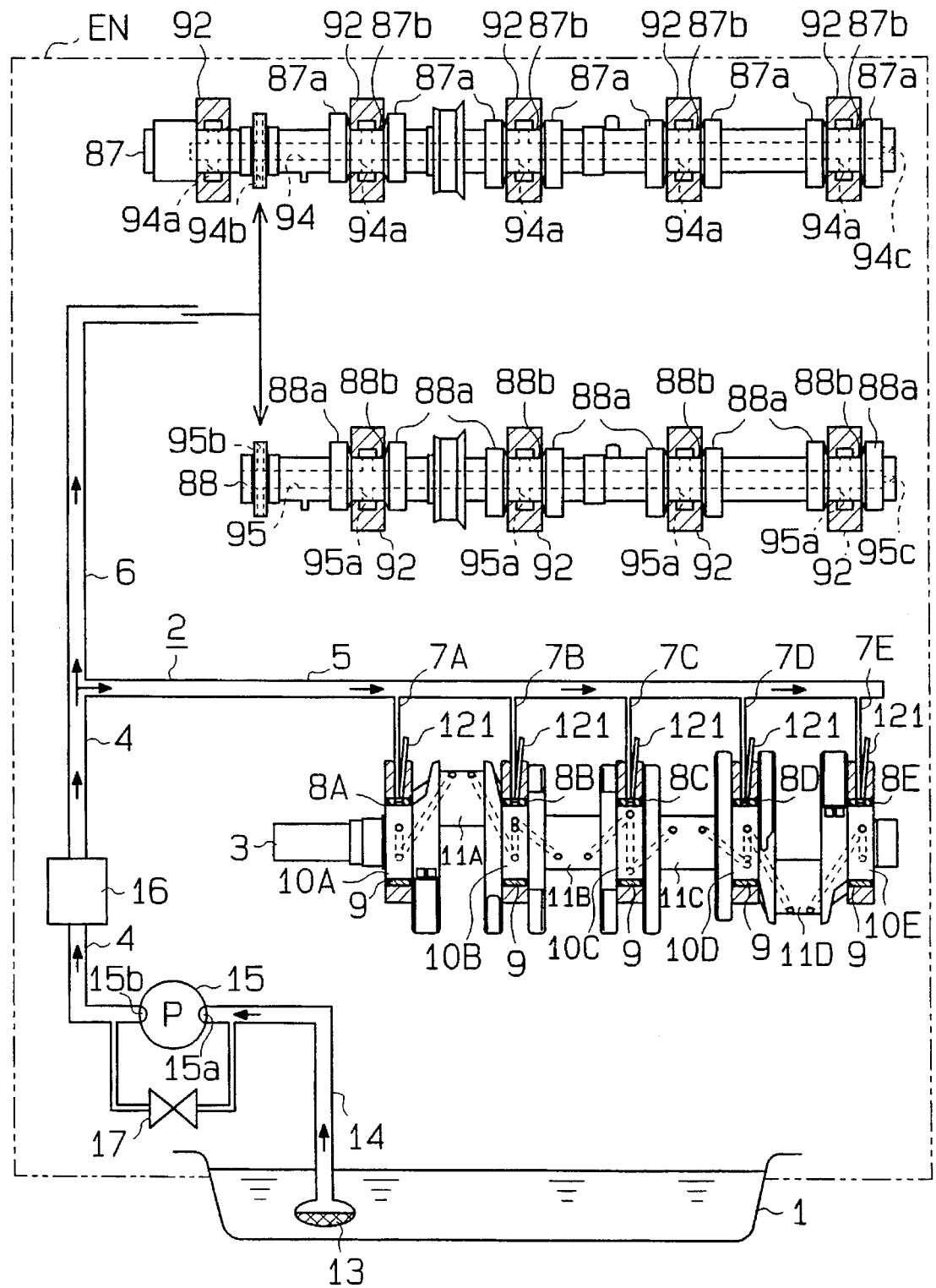
Figure 22:
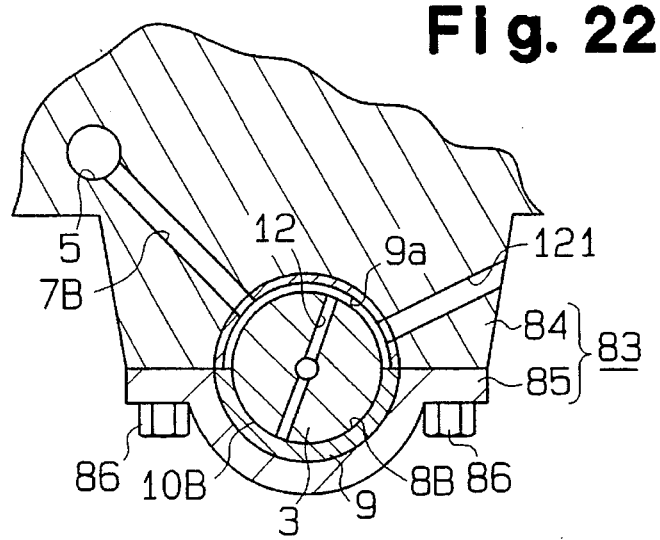

In this embodiment, the oil passages 19A to 19E, the oil return passage 81 and the first oil control valve 82 in the seventh embodiment are removed. Instead, oil return passages 121 are formed in the bearing housings 83 to return part of the lubricating oil LO supplied to the bearings 8A to 8E to the oil pan 1. More specifically, the oil return passages 121 for connecting the oil grooves 9a to the outside are respectively formed in the housing bodies 84 of the bearings 8A–8E, as shown in FIGS. 21 and 22.

Figure 23:
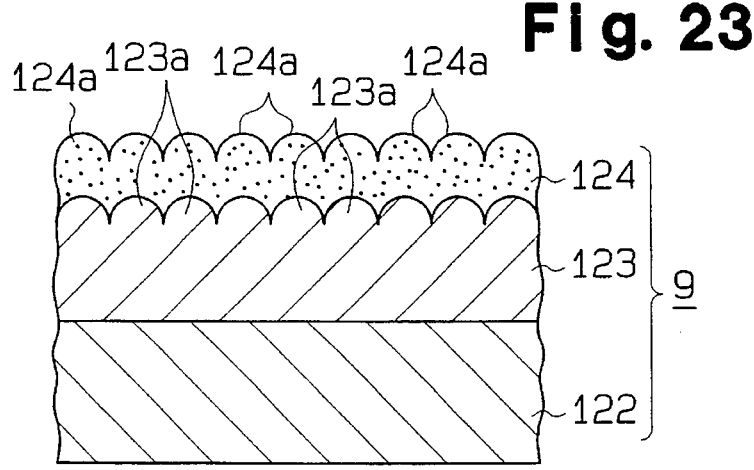

The bearing metals 9 in this embodiment have the following cross-sectional structure. As shown in FIG. 23, each bearing metal 9 has a three-layer structure having a backing metal 122, a lining 123 and an overlay 124 laminated in order from the outer surface side. A plurality of projections 123a each extending in parallel to the circumferential direction and having a round cross section are formed in the inner wall of the lining 123. Those projections 123a are formed adjacent to one another and their height is set equal to or lower than "1 mm." As the overlay 124 is provided on the inner wall of the lining 123, projections 124a similar to those of the lining 123 are also formed in the inner wall of the overlay 124. The height of the projections 124a is also set equal to or lower than "1 mm."

Figure 24:
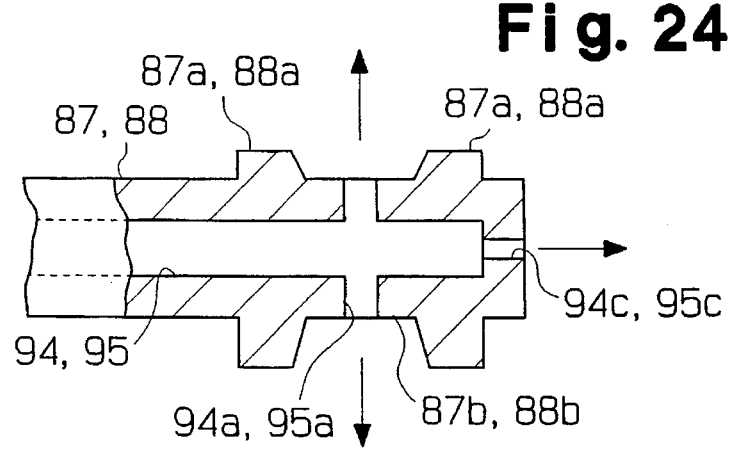

Further, the relieve oil passages 96 and oil jet pipes 97 of the valve system in the seventh embodiment are removed in this tenth embodiment. Instead, communication holes 94c and 95c for connecting the ends of the shaft oil passages 94 and 95 to the outside are formed in the camshafts 87 and 88 at their one ends, as shown in FIGS. 21 and 24.

According to the lubricating apparatus of this embodiment, therefore, when the engine EN is running irrespectively of at a low temperature or a high temperature, part of the lubricating oil LO supplied to the individual bearings 8A to 8E via the respective oil passages 7A to 7E from the crankshaft-system oil passage 5 is relieved outside from the bearing housings 83 through the oil return passages 121. The relieved lubricating oil LO returns directly to the oil pan 1. Likewise, part of the lubricating oil LO supplied to the shaft oil passages 94 and 95 of the camshafts 87 and 88 from the valve-system oil passage 6 is relieved outside from one ends of the camshafts 87 and 88 through the communication holes 94c and 95c, and then returns to the oil pan 1. Accordingly, this embodiment will have the same action and advantage as the seventh embodiment.

In this embodiment in particular, even when the temperature of the engine EN is high, the lubricating oil LO is relieved from the oil passages 121 and the communication holes 94c and 95c, so that the oil pressure at the individual bearings 8A–8E, 87b and 88b can be reduced. Thus, the oil films at the bearings 8A–8E, 87b and 88b are always thin and a large amount of the lubricating oil LO always passes there. Consequently, the frictional loss at the bearings 8A–8E, 87b and 88b will always be reduced, and the bearings 8A–8E, 87b and 88b will always be cooled efficiently. This will prevent the burning of the bearings 8A–8E, 87b and 88b.

In addition, the bearing metals of the bearings 8A–8E of the crankshaft system in this embodiment each have the cross section as shown in FIG. 23. The crank journals 10A to 10E therefore contact the bearing metals via the projections 124a of the overlays 124, reducing the area of contact between each of the crank journals 10A–10E and the associated bearing metal 9. Further, the lubricating oil LO is retained between the projections 124a. This will suppress the heat generation caused by the contact of the crank journals 10A–10E with the bearing metals 9, allowing the withstand load at each of the crank journals 10A–10E to be increased. Furthermore, as the wetting property of the crank journals 10A–10E gets better by the lubricating oil LO, the frictional loss at the bearings 8A–8E will further be reduced.

Eleventh Embodiment

Figure 25:
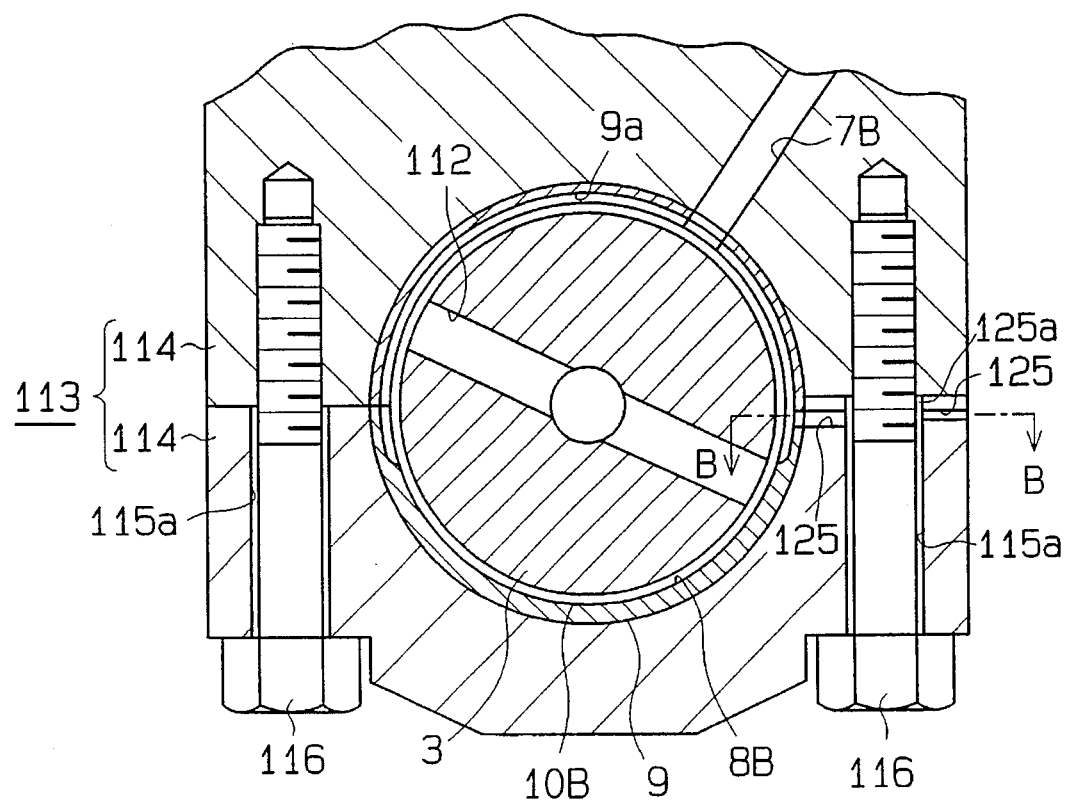
Figure 26:
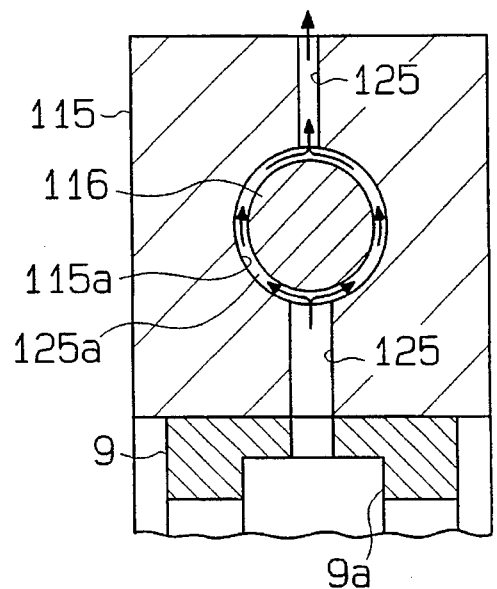

A lubricating apparatus for an engine according to the eleventh embodiment of this invention will now be described referring to FIGS. 25 and 26. The same reference numerals as used for the ninth embodiment will also be used to specify basically the same components in this embodiment to avoid repeating their description. The following description will be centered on the particular difference between this embodiment and the ninth embodiment.

In this embodiment, the communication grooves 117 formed in the shaft holders 115 of the bearings 8A to 8E and the rings 118 in the ninth embodiment are removed. Instead, an oil return passage 125 penetrating one of the bolt holes 115a and the bearing metal 9 is formed in the shaft holder 115 in association with that bolt hole 115a. The gap between the bolt hole 115a and the bolt 116 in the oil return passage 125 becomes a communication groove 125a formed around the bolt 116. One end of this oil return passage 125 is open to the outside of the shaft holder 115, while the other end is open to the oil groove 9a of the bearing metal 9. The inside diameter of the opening of the oil return passage 125 on the former side is set smaller than that of the opening on the latter side.

According to the lubricating apparatus of this embodiment, therefore, when the engine EN is running irrespectively of at a low temperature or a high temperature, part of the lubricating oil LO supplied to the individual bearings 8A to 8E via the respective oil passages 7A to 7E is relieved outside of the shaft holders 115 through the oil grooves 9a of the bearing metals 9, the communication grooves 125a and the oil return passages 125. The relieved lubricating oil LO returns directly to the oil pan 1. Accordingly, this embodiment will have the same action and advantage as the tenth embodiment.

In addition, since the communication groove 125a and oil return passage 125 have only to be formed in the shaft holder 115 and the bearing metal 9 in this embodiment, the whole lubricating apparatus can be manufactured easily.

Although eleven embodiments of the present invention have been described herein, it should be apparent to those skilled in the art that the present invention may be embodied in many other specific forms without departing from the spirit or the scope of the invention. Particularly, it should be understood that the following modifications may be employed.

In the first embodiment, the oil tank 21 and check valve 22 are provided midway in the oil recirculation passage 18, and the downstream side of the oil recirculation passage 18 is connected to the oil control valve 23 in the strainer pipe 14. Alternatively, the oil tank and check valve may be removed from the oil recirculation passage, and an oil control valve may be provided midway in the oil recirculation passage whose downstream side may be connected to the oil pan instead. In this case, the lubricating oil returned from the oil recirculation passage helps heating the lubricating oil in the oil pan.

In the second embodiment, the oil recirculation passage is designed to merely return the lubricating oil LO to the oil tank 32. If the designed pressures at the restrictors 20, 36 and 37 are set relatively high, the lubricating oil LO reserved in the oil tank 32 will be supplied to the bearings 8A to 8E when the engine is running at a high speed. In this case, since a large amount of lubricating oil LO can be supplied to the bearings 8A–8E when the engine is running at a high speed, the reliability of the bearings 8A–8E can be improved.

If the amount of the lubricating oil LO in the oil pan 1 becomes unnecessarily smaller in the second embodiment, the lubricating oil LO retained in the oil tank 32 may be used to supplement the lubricating oil LO to the oil pan 1. To accomplish this supplement automatically, an oil passage should be provided between the oil tank 32 and the oil pan 1 with an electromagnetic valve provided midway in that oil passage, and an oil level gauge should be provided in the oil pan 1. When the measurement of the oil level gauge becomes equal to or below a predetermined value, the electromagnetic valve is open to supply the lubricating oil LO in the oil tank 32 to the oil pan 1.

Although the oil tank 32 is provided separate from the restrictors 20, 36 and 37 and the check valve 22 in the second embodiment, those restrictors and check valve may be provided integrally with the oil tank.

Figure 27:
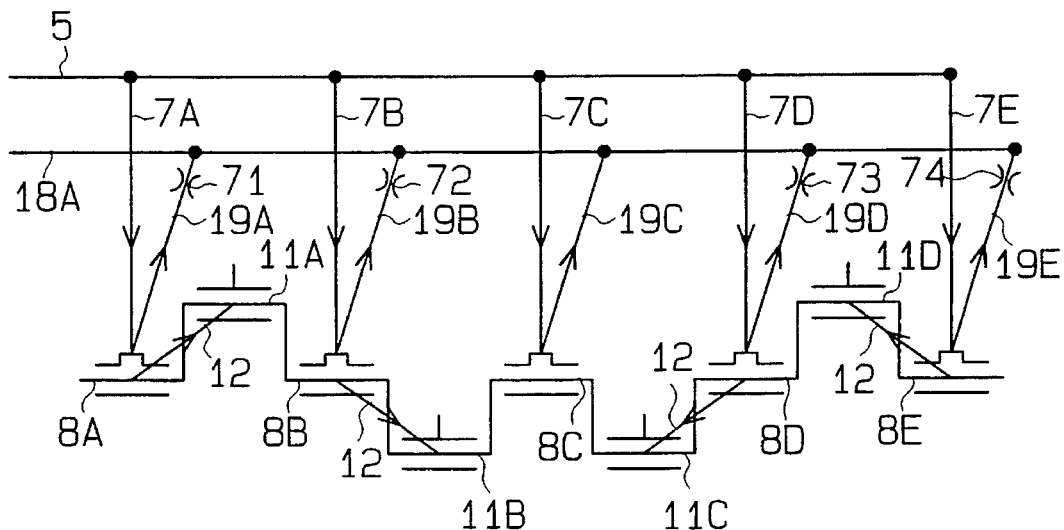

In the third embodiment, the restrictor 41 is provided on the upstream side of the crankshaft-system oil passage 5, and the second oil supplying passage 12 for supplying the lubricating oil LO to the crank pins 11A–11D adjoining to the respective bearings 8A–8E is provided in every one of the bearings 8A–8E. This restrictor 41 restricts the amount of the lubricating oil LO to be supplied to the bearings 8A–8E to some degree, and restricts the amount of the lubricating oil LO to be sucked out to the oil recirculation passage 18A from the bearings 8A–8E. As a modification, as shown in FIG. 27, the restrictor 41 may be removed from the crankshaft-system oil passage 5, and the second oil supplying passages 12 may be provided between the bearing 8A and the crank pin 11A, between the bearing 8B and the crank pin 11B, between the bearing 8D and the crank pin 11C, and between the bearing 8E and the crank pin 11D, respectively. The second oil supplying passage 12 is not provided at the bearing 8C, and restrictors 71, 72, 73 and 74 are provided in the respective oil passages 19A, 19B, 19D and 19E corresponding to the other bearings 8A, 8B, 8D and 8E. In this case, the amount of the lubricating oil LO sucked out to the oil passages 19A, 19B, 19D and 19E becomes relatively small at those bearings 8A, 8B, 8D and 8E among the individual bearings 8A–8E where the lubricating oil LO is supplied to the crank pins 11A to 11D via the second oil supplying passage 12. At a low temperature, a sufficient amount of the lubricating oil LO to be supplied to the other moving parts including the crank pins 11A–11D can be secured.

Figure 28:
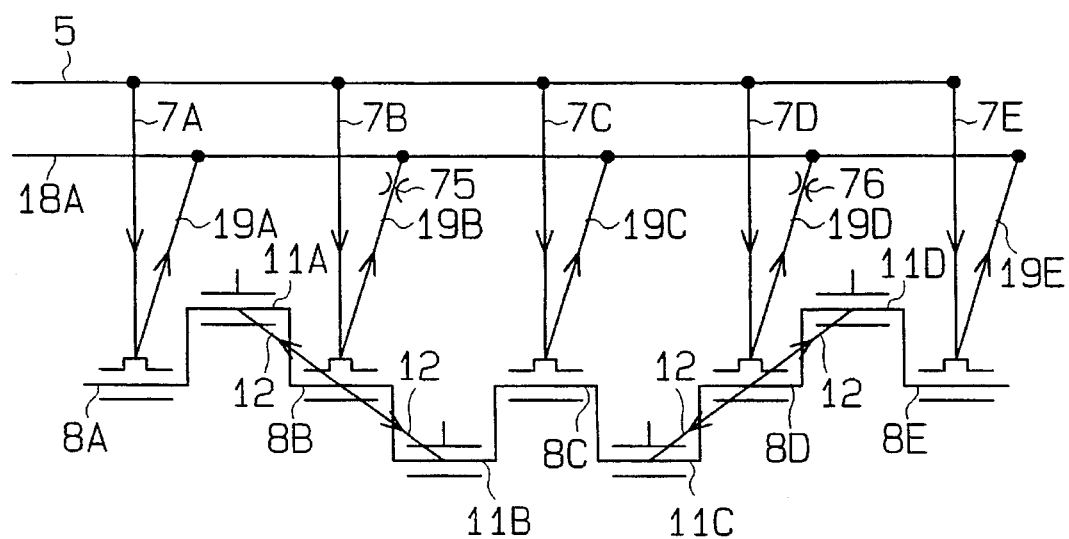

As shown in FIG. 28, the restrictor 41 may be removed from the crankshaft-system oil passage 5, and the second oil supplying passages 12 may be provided between the crank pins 11A and 11B adjoining to the bearing 8B, and between the crank pins 11C and 11D adjoining to the bearing 8D. The second oil supplying passage 12 is not provided at the remaining bearings 8A, 8C and 8E, and restrictors 75 and 76 are provided in the respective oil passages 19B and 19D corresponding to the bearings 8B and 8D. In this case too, the amount of the lubricating oil LO sucked out to the oil passages 19B and 19D becomes relatively small at those bearings 8B and 8D among the individual bearings 8A–8E where the lubricating oil LO is supplied to the crank pins 11A to 11D via the second oil supplying passage 12. At a low temperature, a sufficient amount of the lubricating oil LO to be supplied to the other moving parts including the crank pins 11A–11D can be secured.

Figure 29:
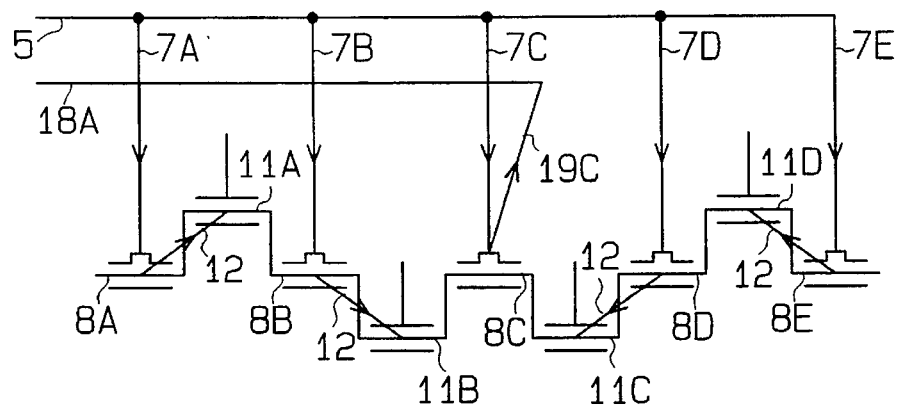

In the third embodiment, the restrictor 41 is provided on the upstream side of the crankshaft-system oil passage 5, and the second oil supplying passage 12 for supplying the lubricating oil LO to the crank pins 11A–11D adjoining to the respective bearings 8A–8E is provided in every one of the bearings 8A–8E. This restrictor 41 restricts the amount of the lubricating oil LO to be supplied to the bearings 8A–8E to some degree, and restricts the amount of the lubricating oil LO to be sucked out to the oil recirculation passage 18A from the bearings 8A–8E. As a modification, as shown in FIG. 29, the restrictor 41 may be removed from the crankshaft-system oil passage 5, and the second oil supplying passage 12 may be provided between the bearing 8A and the crank pin 11A, between the bearing 8B and the crank pin 11B, between the bearing 8D and the crank pin 11C, and between the bearing 8E and the crank pin 11D. Further, the oil passages 19A, 19B, 19D, 19E between those bearings 8A, 8B, 8D and 8E and the oil recirculation passage 18A are removed, and the oil passage 19C is provided only between the bearing 8C and the oil recirculation passage 18A. In this case, the lubricating oil LO will not be sucked out to the oil recirculation passage 18A from those bearings 8A, 8B, 8D and 8E among the bearings 8A–8E where the lubricating oil LO is supplied to the crank pins 11A to 11D via the second oil supplying passage 12. The lubricating oil LO will be sucked out to the oil recirculation passage 18A through the oil passage 19C only at the bearing 8C where the lubricating oil LO is not supplied to the crank pins 11A–11D. Regardless of at a low or high temperature, a sufficient amount of the lubricating oil LO to be supplied to the other moving parts including the crank pins 11A–11D can be secured.

Figure 30:
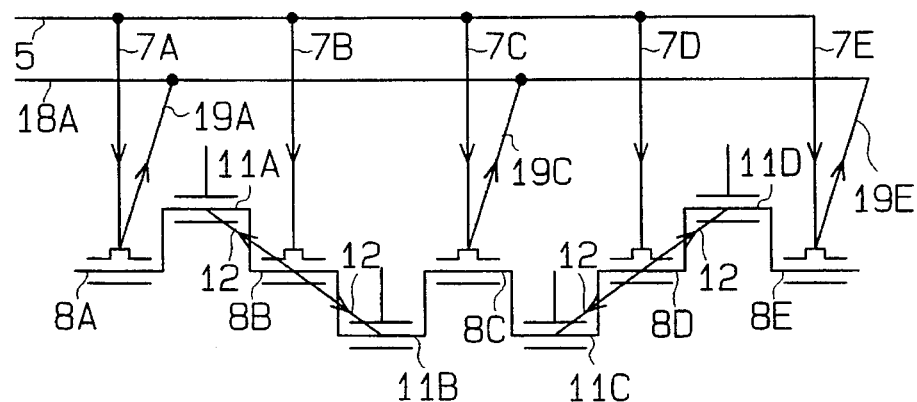

Like in the above-described modification, as shown in FIG. 30, the restrictor 41 may be removed from the crankshaft-system oil passage 5, and the second oil supplying passages 12 may be provided between the crank pins 11A and 11B adjoining to the bearing 8B, and between the crank pins 11C and 11D adjoining to the bearing 8D. Further, the oil passages 19B and 19D between the bearings 8B and 8D and the oil recirculation passage 18A are removed, and the oil passages 19A, 19C and 19E are provided between the other bearings 8A, 8C and 8E and the oil recirculation passage 18A. In this case, the lubricating oil LO will not be sucked out to the oil recirculation passage 18A from those bearings 8B and 8D among the individual bearings 8A–8E where the lubricating oil LO is supplied to the crank pins 11A to 11D via the second oil supplying passage 12. The lubricating oil LO will be sucked out to the oil recirculation passage 18A through the oil passages 19A, 19C and 19E only at the bearings 8A, 8C and 8E where the lubricating oil LO is not supplied to the crank pins 11A–11D. Irrespective of at a low or high temperature, a sufficient amount of the lubricating oil LO to be supplied to the other moving parts including the crank pins 11A–11D can be secured.

In the third embodiment, the restrictor 41 is provided on the upstream side of the crankshaft-system oil passage 5 to restrict the amount of the lubricating oil LO to be supplied to the bearings 8A–8E to some degree, and restricts the amount of the lubricating oil LO to be smaller than that supplied to the valve system. As another modification, the restrictor 41 may be removed from the crankshaft-system oil passage 5, and the inside diameters of the oil passages 7A–7E connected to the bearings 8A–8E may be set small instead.

Figure 31:
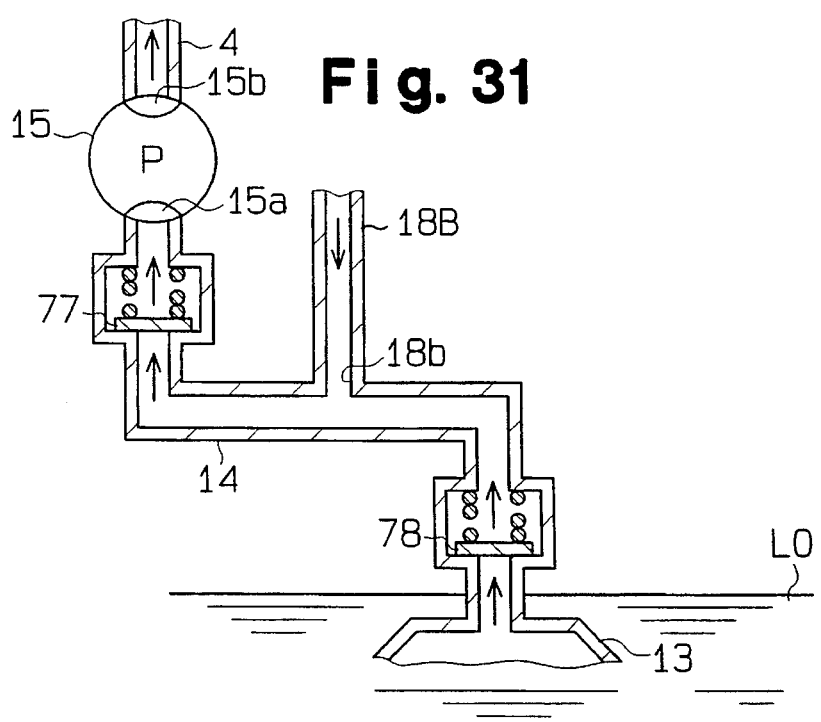

In the third to sixth embodiments, the opening end 18*b* of the oil recirculation passage 18B is located adjacent to the oil strainer 13 in the oil pan 44. As a modification, as shown in FIG. 31, the opening end 18*b* of the oil recirculation passage 18B may be connected to the strainer pipe 14, with check valves 77 and 78 provided in the strainer pipe 14 upstream of that point of connection. Further, the lubricating oil LO, which is recirculated from the individual bearings through the oil recirculation passage 18B, is directly sent to the inlet side of the oil pump 15 without being returned to the oil pan. In this case, as the lubricating oil LO flowing through the oil recirculation passage 18B does not return to the oil pan, the warm-up time characteristic of the lubricating oil LO can be improved accordingly. Furthermore, the space between both check valve 77 and 78 serves as a air-liquid separating tank, thus preventing air from being sucked into the oil pump 15.

Although the oil switching valve 42 having the second and third oil control valves structured integrally is provided in the third to sixth embodiments, the second and third oil control valves may be provided separately.

In the first through eighth embodiments, the second oil control valve 23, oil switching valve 42 and fist oil control valve 82 are open or closed in sensitive to the temperature by the thermo waxes 25*a* and 51. Alternatively, oil control valves and an oil switching valve both of an electromagnetic type may be provided so that those valves are electrically open or closed in accordance with the temperature condition of the engine. In this case, the number of rotations of the engine as well as the temperature condition of the engine may be input as input parameters to the controller, so that the oil control valves and oil switching valve are electrically open or closed in accordance with that number of rotations. For instance, when the number of rotations of the engine becomes equal to or above a predetermined value, the oil control valves and oil switching valve may be closed to increase the oil pressures at the individual bearings 8A–8E, 87*b* and 88*b*.

The first through eighth embodiments are so designed that the lubricating oil LO expelled from one oil pump 15 is distributed to the crankshaft-system oil passage 5 and the valve-system oil passage 6. As a modification, the lubricating oils pumped out from different oil pumps may be supplied to the crankshaft-system oil passage 5 and the valve-system oil passage 6 separately. That is, the lubricating oil expelled from a single oil pump is sent only to the crankshaft-system oil passage, while the lubricating oil expelled from another oil pump is sent to the valve-system oil passage.

Although the first oil control valve 82 is provided in the oil return passage 81 in the seventh and eighth embodiments, this first oil control valve 82 may be omitted.

In the seventh embodiment, the relief oil passage 96 for supplying the lubricating oil LO to the oil jet pipe 97 is formed in the bearing cap 92 so that the passage 96 is connected to the shaft oil passages 94 and 95. Alternatively, an oil passage for supplying the lubricating oil LO to the oil jet pipe 97 may be directly branched from the valve-system oil passage 6.

Figure 32:
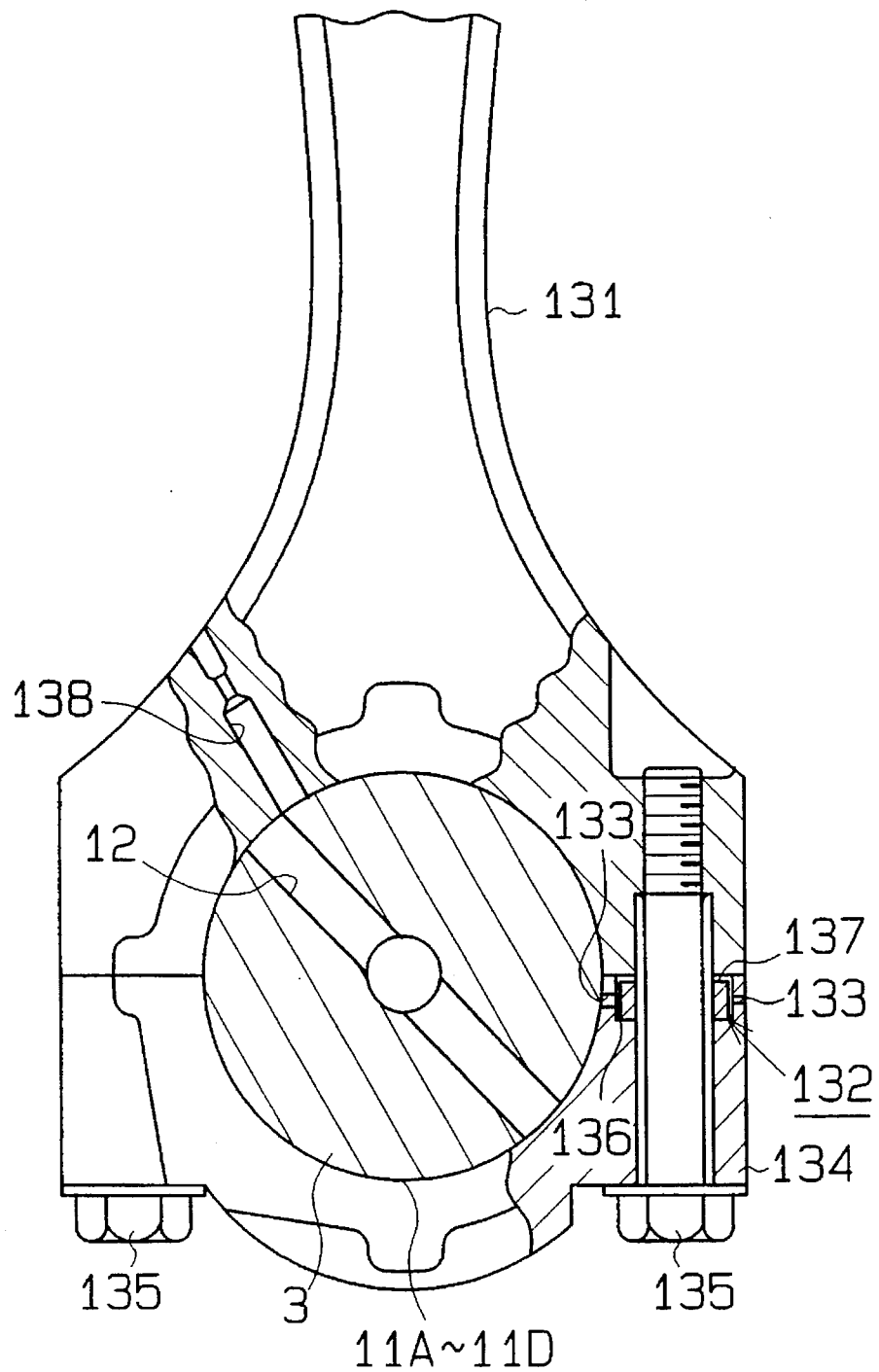

In the ninth embodiment, the communication groove 117 and ring 118 are provided around the bolt 116 in the bearing housing 113 which constitutes each of the bearings 8A–8E, thereby constituting the first oil control valve 112, and the oil return passage 111 penetrating the groove 117 and the bearing metal 9 is formed. As a modification, as shown in FIG. 32, a first oil control valve 132 and an oil return passage 133 may be provided on a con'rod 131, which is fitted over each of the crank pins 11A–11D of the crankshaft 3. More specifically, an annular communication groove 136 is formed in association with one of bolts 135 for fastening a bearing cap 134, which constitutes the bearing housing of the con'rod 131, and the oil return passage 133 penetrating that groove 136 is formed. A ring with a large coefficient of thermal expansion is disposed around the bolt 135 in the groove 136, constituting the first oil control valve 132. In this case, the first oil control valve 132 is open when the engine is cold, and part of the lubricating oil LO supplied to the crank pins 11A–11D is relieved outside the bearing cap 134 through the groove 136 and oil return passage 133.

In this case, the oil return passage 133 is also provided on the opposite side to an oil jet 138 formed on the con'rod 131, i.e., on the counter-thrust side, as shown in FIG. 32. This structure permits the lubricating oil LO, relieved from the oil return passage 133, to be sprayed in the opposite direction to the direction of the oil jetted by the oil jet 138, so as to be supplied to the cylinder bores (not shown) at a low temperature. This will provide an effective scuffing measure between the cylinder bores and pistons.

In the eleventh embodiment, the oil return passage 125 penetrating the bolt hole 115*a* is formed in the bearing housing 113 constituting each of the bearings 8A–8E. An oil return passage penetrating the bolt hole may be likewise formed in the bearing cap of the con'rod for the same purpose.

Figure 33:
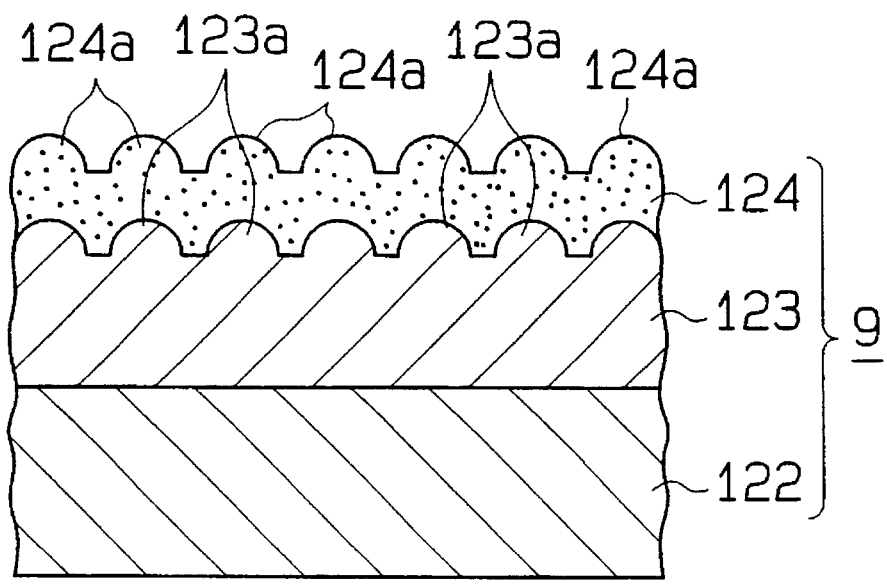
Figure 34:
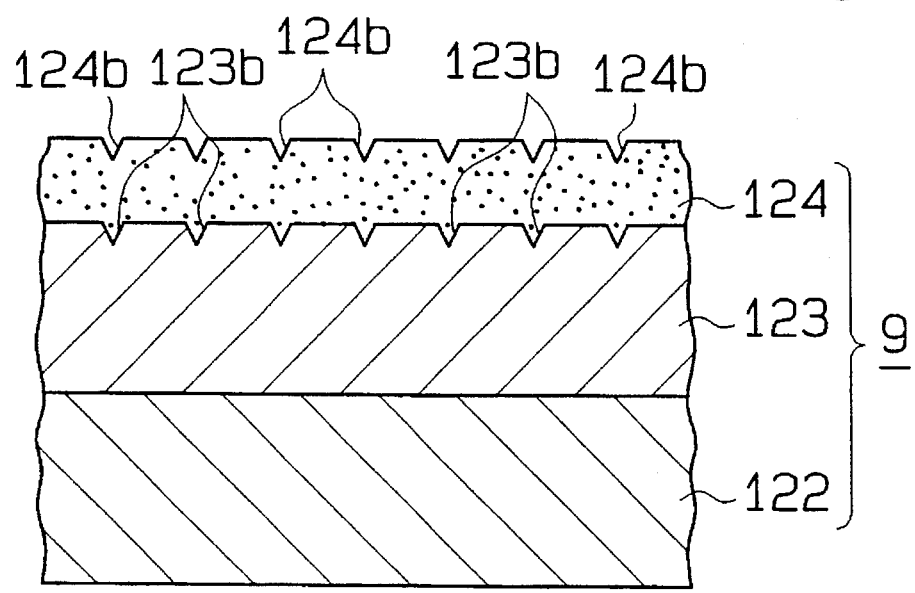

In the tenth embodiment, the bearing metal 9 has a three-layer structure having a lamination of the backing metal 122, lining 123 and overlay 124, and a plurality of projections 123*a* each extending in parallel to the circumferential direction are formed in the inner wall of the lining 123, whereby similar projections 124*a* are formed in the inner wall of the overlay 124. As a modification, as shown in FIG. 33, a plurality of projections 123*a* extending in parallel to the circumferential direction may be formed at given intervals in the inner wall of the lining 123, so that similar projections 124*a* may be formed in the inner wall of the overlay 124. As another modification, as shown in FIG. 34, a plurality of elongated grooves 123*b* extending in parallel to the circumferential direction may be formed at given intervals in the inner wall of the lining 123, so that similar elongated grooves 124*b* may be formed in the inner wall of the overlay 124.

Therefore, the present examples and embodiments are to be considered as illustrative and not restrictive, and the invention is not to be limited to the details given therein, but may be modified within the scope of the appended claims.

What is claimed is:

1. A lubricating apparatus for an engine, the engine including a crankshaft; at least one journal bearing for supporting the crankshaft; and an oil pan for storing a lubricating oil reserve, the apparatus comprising:

a pump having an inlet port and a discharge port, for pumping the oil up from the oil pan to discharge its oil from the discharge port;

a first oil passage for providing fluid communication between said discharge port and the journal bearing to supply the oil from said pump to the bearing;

an oil recirculation passage for providing fluid communication between the bearing and said inlet port to return the oil at the bearing to said pump, thereby causing oil recirculation; and first control means provided along said oil recirculation passage, for controlling the oil recirculation in accordance with the warming-up condition of the engine, said first control means including a first temperature activated valve assembly for allowing the oil to return from the bearing to said pump via said oil recirculation passage, when the temperature of the engine is lower than a predetermined temperature.

2. The lubricating apparatus according to claim 1, wherein the crankshaft includes a second oil passage disposed therein for delivering oil from the bearing through the crankshaft to at least one predetermined part other than the bearing.

3. The lubricating apparatus according to claim 1, wherein said first valve assembly includes:

a valve piece disposed contiguous with a valve seat in a closed position and movable therefrom to an open position, for disconnecting the communication between the bearing and said inlet port of the pump through said oil recirculation passage; and a drive mechanism for positioning said valve piece in accordance with the engine temperature, whereby when the engine temperature is lower than said predetermined temperature, said valve piece is disposed at a position where it allows the communication between the bearing and said inlet port.

4. The lubricating apparatus according to claim 1 further comprising:

a communication passage for connecting said first oil passage to said oil recirculation passage to allow the communication therebetween; and second control means provided between said communication passage and said oil recirculation passage, for controlling an additional oil supply to the bearing in accordance with the warming-up condition of the engine, said second control means including a second valve assembly for providing fluid communication between said first oil passage and said oil recirculation passage via said communication passage, when the engine temperature is higher than said predetermined temperature.

5. The lubricating apparatus according to claim 4, wherein said first and second control means are formed by a single valve assembly which comprises:

a first valve piece for disconnecting the communication between the bearing and said inlet port of the pump through said oil recirculation passage; and a second valve piece integrally connected to said first valve piece, for disconnecting the communication between the bearing and said discharge port of the pump through said communication passage and said oil recirculation passage; and a drive mechanism for positioning said first and second valve pieces in accordance with the engine temperature, whereby when the engine temperature is lower than said predetermined temperature, said first and second valve pieces are disposed at a first position where said first valve piece allows the communication between the bearing and said inlet port and where said second valve piece blocks the communication between the bearing and said discharge port, and when the engine temperature is higher than said predetermined temperature, said first and second valve pieces are disposed at a second position where said first valve piece blocks the communication between the bearing and said inlet port and where said second valve piece allows the communication between the bearing and said discharge port.

6. The lubricating apparatus according to claim 1, wherein the engine has a plurality of bearings which are divided into a first group to which at least one bearing belongs and a second group to which the remaining bearings belong; and wherein the apparatus further comprises at least one first group oil passage corresponding to each bearing of said first group, said first group oil passage supplying the oil at the associated bearing to the engine's parts other than the bearings.

7. The lubricating apparatus according to claim 6 further comprising at least one check valve disposed within said oil recirculation passage corresponding to each bearing of said first group, for preventing the oil from flowing toward said oil recirculation passage from the associated bearing.

8. The lubricating apparatus according to claim 6, wherein the bearings of said first group, each corresponding to said first group oil passage; are free from the communication with said oil recirculation passage, while the bearings of said second group keep communicating with said oil recirculation passage.

9. The lubricating apparatus according to claim 1, wherein the engine has a plurality of bearings which are divided into a first group to which at least one bearing belongs and a second group to which the remaining bearings belong; and wherein the apparatus further comprises:

at least one first group oil passage corresponding to each bearing of said first group, said first group oil passage supplying the oil at the associated bearing to the engine's parts other than the bearings; and oil distribution mean provided along said first oil passage, for regulating the oil supply so that an amount of oil supplied to the bearings of said first group is more than an amount of oil supplied to the bearings of said second group.

10. The lubricating apparatus according to claim 9, wherein said oil distribution means includes:

at least one first passway corresponding to each bearing of said first group, for providing fluid communication between the associated bearing and said first oil passage, said first passway having a predetermined inner diameter; and at least one second passway corresponding to each bearing of said second group, for providing fluid communication between the associated bearing and said first oil passage, said second passway having a predetermined inner diameter smaller than that of said first passway.

11. The lubricating apparatus according to claim 9, wherein said oil distribution means includes:

at least one first passway corresponding to each bearing of said first group, for providing fluid communication between the associated bearing and said first oil passage; and at least one second passway corresponding to each bearing of said second group, for providing fluid communication between the associated bearing and said first oil passage, said second passway having a restrictor formed therealong.

12. A lubricating apparatus for an engine, the engine including a crankshaft; at least one journal bearing for supporting the crankshaft; and an oil pan for storing a lubricating oil reserve, the apparatus comprising:

a pump having a discharge port and an inlet port communicating with the oil pan, for pumping the oil up from the oil pan to discharge its oil from the discharge port;

an oil supplying passage for providing fluid communication between said discharge port and the bearing for the crankshaft to supply the oil from said pump to the bearing;

an oil flow passage formed between the crankshaft and the bearing to communicate with said oil supplying passage, so that the crankshaft and the bearing are cooled by oil flowing through the oil flow passage an oil returning route connected to said oil supplying passage via said oil flow passage, for leading the oil from the bearing to the oil pan; and control means provided along said oil returning route for controlling the flow of oil in accordance with the warming-up condition of the engine, said control means allowing the oil to return from the bearing to the oil pan via said oil returning route when the temperature of the engine is lower than a predetermined temperature.

13. The lubricating apparatus according to claim 12, wherein said control means includes a control valve assembly which comprises:

a valve piece for disconnecting the communication between the bearing and the oil pan via said oil returning route; and a drive mechanism for positioning said valve piece in accordance with the engine temperature, whereby when the engine temperature is lower than said predetermined temperature, said valve piece is disposed at a position where it allows the communication between the bearing and the oil pan.

14. The lubricating apparatus according to claim 12, wherein said oil returning route includes a first oil passage connecting the bearing with the oil pan.

15. The lubricating apparatus according to claim 14, wherein the engine further includes a housing for holding the bearing;

wherein said oil returning route includes a second oil passage formed in said housing, for providing fluid communication between the bearing and the outside of said housing; and wherein a valve piece is located midway in said second oil passage, the volume of said valve piece being changeable in accordance with the temperature thereof, whereby said valve piece blocks said second oil passage when it is heated by the oil over a predetermined temperature.

16. The lubricating apparatus according to claim 15, wherein said housing comprises two housing parts which are secured to each other with a bolt, thereby holding the bearing therebetween;

wherein said second oil passage includes a circular groove formed around said bolt; and wherein said valve piece is a ring-shaped member to be disposed in said circular groove.

17. A lubricating apparatus for an engine, the engine including a crankshaft; at least one journal bearing for supporting the crankshaft; and an oil pan for storing a lubricating oil reserve, the apparatus comprising:

a pump having a discharge port and an inlet port communicating with the oil pan, for pumping the oil up from the oil pan to discharge its oil from the discharge port;

an oil supplying passage for providing fluid communication between said discharge port and the bearing for the crankshaft to supply the oil from said pump to the bearing;

an oil flow passage formed between the crankshaft and the bearing to communicate with said oil supplying passage, so that the crankshaft and the bearing are cooled by oil flowing through the oil flow passage; and an oil returning route connected to said oil supplying passage via said oil flow passage, for leading the oil from the bearing to the oil pan, wherein said oil returning route includes an exterior oil passage formed in said housing, for providing fluid communication between the bearing and the outside of said housing;

wherein the engine further includes a housing for holding the bearing, said housing comprising two housing parts which are secured to each other with a bolt, thereby holding the bearing therebetween; and wherein said exterior oil passage includes a circular groove formed around said bolt.

* * * * *

UNITED STATES PATENT AND TRADEMARK OFFICE
CERTIFICATE OF CORRECTION

PATENT NO. : 5,517,959
DATED : May 21, 1996
INVENTOR(S) : Zenichiro KATO, et al.

It is certified that error appears in the above-indentified patent and that said Letters Patent is hereby corrected as shown below:

On the title page, item [75] change name of second inventor from "Touyu Ichimiya" to --Touru Ichimiya--.

Column 2, line 47, delete "the" at end of line.

Column 2, line 50, delete "the" before "communication".

Column 4, line 24, delete "an" at beginning of line.

Column 5, line 12, change "order" to --sequence--.

Column 6, line 18, change "Of" to --of--.

Column 7, line 3, after "passage" insert --5--.

Column 8, line 65, delete "An" and change "another" to --Another--.

Column 10, line 39, delete "An" and change "another" to --Another--.

Column 11, line 26, change "with" to --to--.

Column 12, line 59, delete "applied" and "to".

UNITED STATES PATENT AND TRADEMARK OFFICE
CERTIFICATE OF CORRECTION

PATENT NO. : 5,517,959
DATED : May 21, 1996
INVENTOR(S) : Zenichiro KATO, et al.

It is certified that error appears in the above-indentified patent and that said Letters Patent is hereby corrected as shown below:

Column 16, line 24, change "the" to --a--.

Column 16, line 46, insert --is-- before "provided".

Column 17, line 44, change "the" to --a--.

Column 18, line 30, change "respectively" to --respective--.

Column 23, line 50, change "ends" to --end--.

Column 25, line 5, change "heating" to --heat--.

Column 27, line 22, change "a" to --an--.

Column 27, line 31, change "in sensitive" to --in response--.

Column 30, line 35, change "mean" to --means--.

Signed and Sealed this

First Day of October, 1996

Attest:

BRUCE LEHMAN

Attesting Officer          Commissioner of Patents and Trademarks